US009991955B2

(12) United States Patent
Yamasaki et al.

(10) Patent No.: US 9,991,955 B2
(45) Date of Patent: Jun. 5, 2018

(54) MOBILE DEVICE, TRANSMITTING DEVICE, AND GUIDANCE SYSTEM

(71) Applicant: Panasonic Intellectual Property Management Co., Ltd., Osaka (JP)

(72) Inventors: Shigeaki Yamasaki, Osaka (JP); Yoshihiko Matsukawa, Nara (JP); Masaaki Ikehara, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 4 days.

(21) Appl. No.: 15/251,124

(22) Filed: Aug. 30, 2016

(65) Prior Publication Data
US 2017/0063457 A1 Mar. 2, 2017

(30) Foreign Application Priority Data

Sep. 2, 2015 (JP) .................................. 2015-173222

(51) Int. Cl.
| H04B 10/00 | (2013.01) |
| H04B 10/116 | (2013.01) |
| H04B 10/80 | (2013.01) |
| H04W 4/02 | (2018.01) |
| G08B 7/06 | (2006.01) |

(52) U.S. Cl.
CPC ........... H04B 10/116 (2013.01); H04B 10/80 (2013.01); H04W 4/02 (2013.01); G08B 7/066 (2013.01)

(58) Field of Classification Search
CPC . H04B 10/116; H04B 10/114; H04B 10/1143; H04B 10/1149

USPC ....... 398/172, 118, 119, 128, 130, 127, 135, 398/136, 115, 182, 183, 202, 208; 315/312, 291, 293, 294, 307
See application file for complete search history.

(56) References Cited

U.S. PATENT DOCUMENTS

| 7,970,537 B2 * | 6/2011 | Ann ....................... G01C 21/20 |
| | | 398/172 |
| 9,008,519 B2 * | 4/2015 | Park ................... H04B 10/1149 |
| | | 398/118 |
| 2015/0372753 A1 * | 12/2015 | Jovicic ................. H04B 10/116 |
| | | 398/172 |
| 2016/0248505 A1 * | 8/2016 | Cha ....................... H04B 10/116 |

FOREIGN PATENT DOCUMENTS

| JP | 2000-298034 | 10/2000 |
| JP | 2005-180967 | 7/2005 |
| JP | 2005-331305 | 12/2005 |
| JP | 2009-204542 | 9/2009 |
| JP | 2012-055582 | 3/2012 |

* cited by examiner

Primary Examiner — Hanh Phan
(74) Attorney, Agent, or Firm — Renner, Otto, Boisselle & Sklar, LLP

(57) ABSTRACT

A mobile device includes: a communications circuit which performs wireless communication; a receiver which receives input of a destination from a user; an output which outputs guidance information for guiding the user from a current location to the destination; and a controller which causes the output to output notification information for notifying presence of a transmitting device which emits light for visible light communications, if the communications circuit receives a wireless signal from a transmitting device by the wireless communication.

13 Claims, 16 Drawing Sheets

| DEVICE ID | TIME | CURRENT LOCATION | EXPECTED ARRIVAL TIME | EXPECTED ARRIVAL GATE |
|---|---|---|---|---|
| D001 | 16:30 | PPP STATION GATE, SUBWAY XXX LINE | 17:25 | EAST GATE |
| D002 | 16:30 | ZZZ FRUIT STORE | 17:00 | SOUTHERN WEST GATE |
| D003 | 16:31 | QQQ STATION PLATFORM NUMBER 1, SUBWAY XXX LINE | 17:30 | EAST GATE |
| ... | ... | ... | ... | ... |

MOBILE DEVICE, TRANSMITTING DEVICE, AND GUIDANCE SYSTEM

CROSS REFERENCE TO RELATED APPLICATION

This application claims the benefit of priority of Japanese Patent Application Number 2015-173222, filed Sep. 2, 2015, the entire content of which is hereby incorporated by reference.

BACKGROUND

1. Technical Field

The present disclosure relates to a mobile device, a transmitting device, and a guidance system which utilize visible light communications.

2. Description of the Related Art

Conventionally, systems which utilize visible light communications to provide directions are known. For example, Japanese Unexamined Patent Application Publication No. 2012-55582 discloses an assistance system for the visually-impaired, in which a cane having visible light communications capabilities receives guidance and alert from a light.

SUMMARY

In such a system, the visible light communications are performed between a transmitting device and a mobile device by a light receiver included in the mobile device receiving visible light emitted by the transmitting device. For this reason, if the mobile device is in a place where the visible light does not reach, such as in garment pockets or in bags, the mobile device cannot perform visible light communications with the transmitting device.

Thus, in order to utilize visible light communications to guide a user, it is necessary to prompt the user to direct the light receiver included in the mobile device to the transmitting device, such as an illumination device, emitting visible light. However, it is difficult for the user to identify illumination devices that perform visible light communications, and the user does not know to which illumination device the user should direct the light receiver. For this reason, the system cannot smoothly obtain a current location of the user by visible light communications, and ends up failing to guide the user properly.

Thus, an object of the present disclosure is to provide a mobile device, a transmitting device, and a guidance system which provide proper guidance.

In order to achieve the above object, a mobile device according to one aspect of the present disclosure includes a communications circuit which performs wireless communication not including visible light communication; a receiver which receives input of a destination from a user; an output which outputs guidance information for guiding the user from a current location to the destination; and a controller which causes the output to output notification information for notifying presence of a transmitting device which emits light for visible light communications, if the communications circuit receives a wireless signal from the transmitting device by the wireless communication.

The transmitting device according to one aspect of the present disclosure transmits predetermined information by visible light communications, the transmitting device including: a light source which emits light for visible light communications, the light including the predetermined information; a communications circuit which performs wireless communication not including visible light communication and receives a presence signal indicating presence of a predetermined device; and a controller which causes the communications circuit to transmit notification information for notifying presence of the transmitting device, if the communications circuit receives the presence signal.

The guidance system according to one aspect of the present disclosure includes the mobile device and the transmitting device.

According to the mobile device of the present disclosure, a user is guided properly.

BRIEF DESCRIPTION OF DRAWINGS

The figures depict one or more implementations in accordance with the present teaching, by way of examples only, not by way of limitations. In the figures, like reference numerals refer to the same or similar elements.

FIG. 9 is a diagram illustrating an example of customer attendance information according to the embodiment;

DETAILED DESCRIPTION OF EMBODIMENTS

Hereinafter, a mobile device, a transmitting device, and a guidance system according to embodiments of the present disclosure are described with reference to the accompanying drawings. The embodiments described below are each merely one specific example of the present disclosure. Thus, values, shapes, materials, components, and arrangement and connection between the components, and steps and order of the steps shown in the following embodiments are merely by way of illustration and not intended to limit the present disclosure. Therefore, among the components in the embodiments below, components not recited in any one of the independent claims defining the most generic part of the inventive concept of the present disclosure are described as arbitrary components.

The figures are schematic illustration and do not necessarily illustrate the present disclosure precisely. In the figures, the same reference sign is used to refer to the same component.

Embodiment

[Outline of Guidance System]

Figure 1:
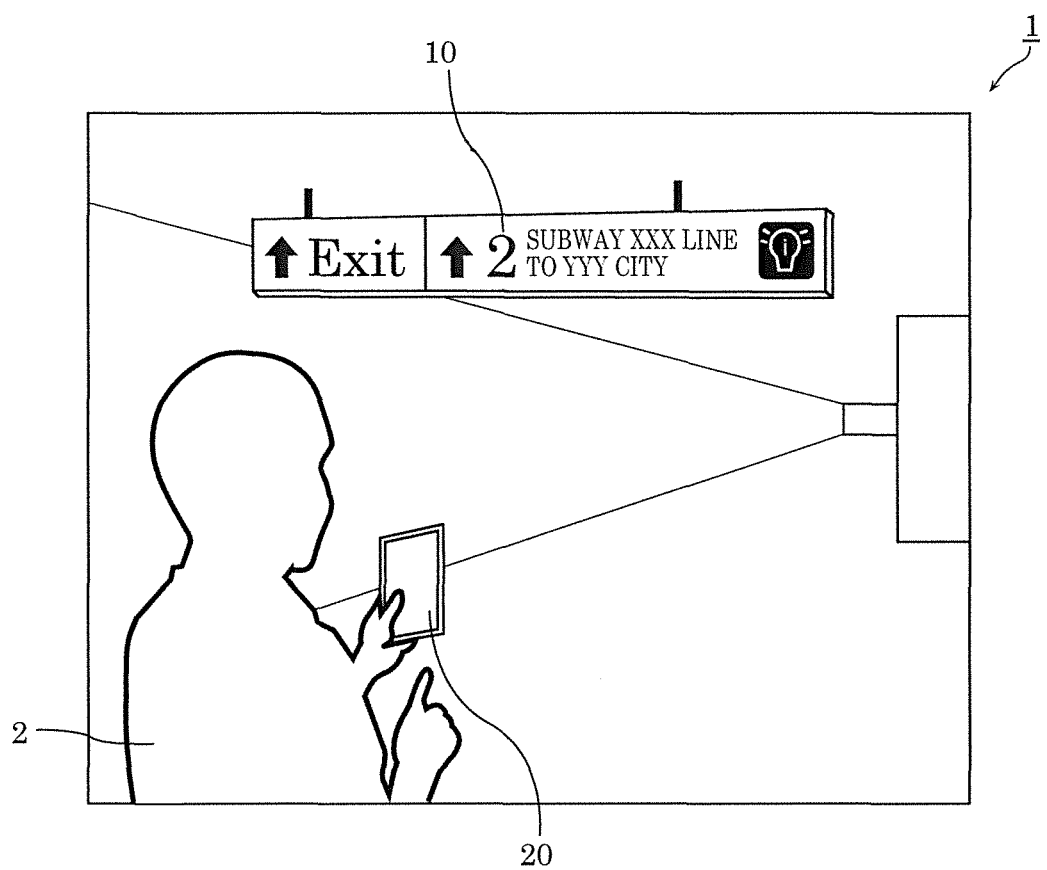
FIG. 1 is a schematic view of an example of an application of a guidance system according to an embodiment.
Figure 2:
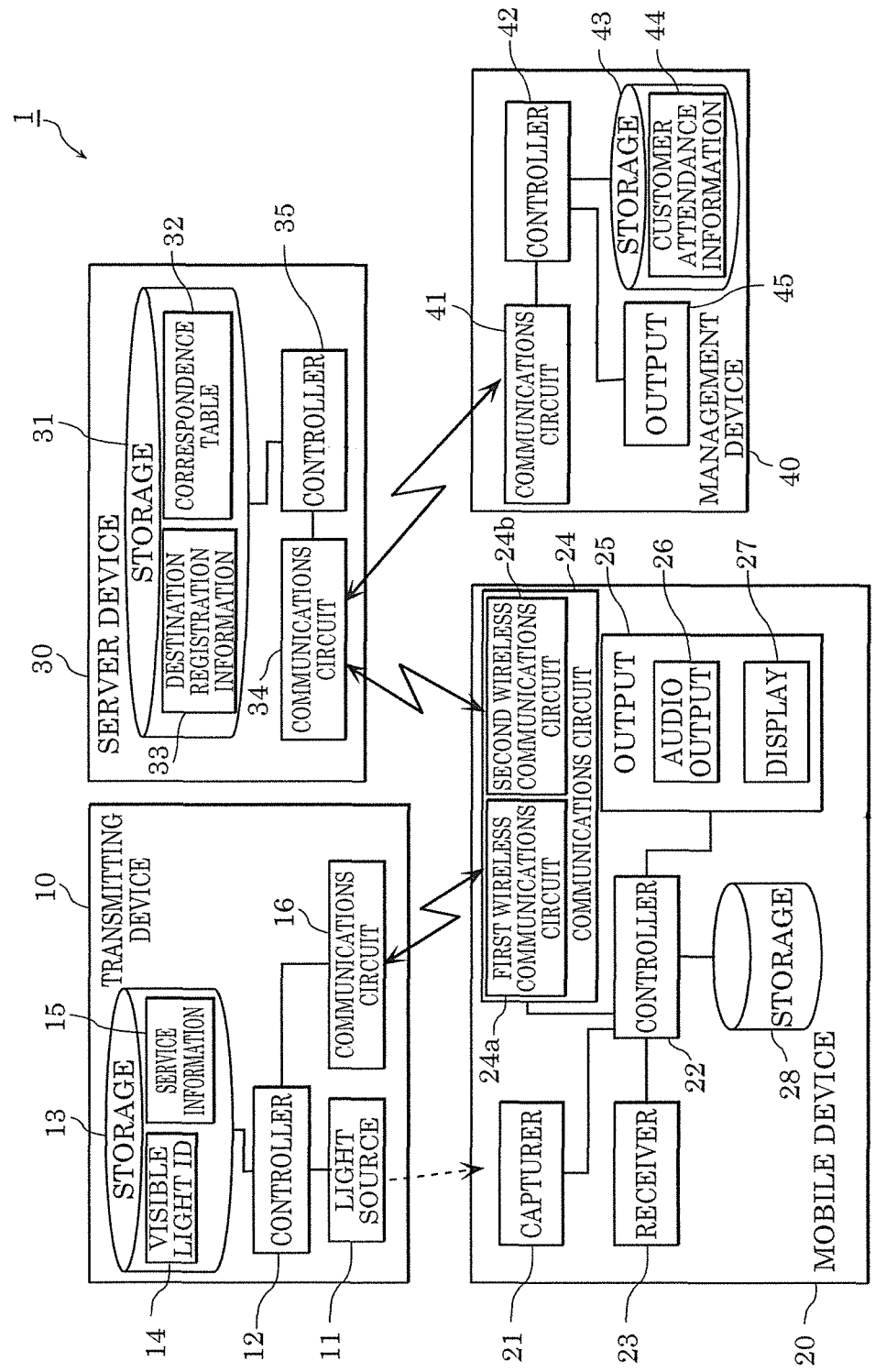
FIG. 2 is a block diagram illustrating functional configuration of the guidance system according to the embodiment.

First, an outline of a guidance system according to the present embodiment is described with reference to FIGS. 1 and 2. FIG. 1 is a schematic view of an example of an application of guidance system 1 according to the present embodiment. FIG. 2 is a block diagram illustrating functional configuration of guidance system 1 according to the present embodiment.

Guidance system 1 uses visible light communications to guide user 2 to a destination. As shown in FIG. 1, guidance system 1 includes transmitting device 10 and mobile device 20. In the present embodiment, as shown in FIG. 2, guidance system 1 further includes server device 30 and management device 40.

Transmitting device 10 transmits predetermined information by visible light communications. In other words, transmitting device 10 is the source of light for the visible light communications which includes the predetermined information. Transmitting device 10 is installed, for example, indoors such as an interior of a building or an underground mall (underground passage). In the present embodiment, as shown in FIG. 1, transmitting device 10 is, for example, a guidance display board mounted on the ceiling of an underground passage, and functions also as an illumination device. It should be noted that transmitting device 10 may be installed outdoors.

Transmitting device 10 is, for example, a lighting apparatus such as a signage light. Alternatively, transmitting device 10 may be a video display device such as a digital signage.

Mobile device 20 performs visible light communications with transmitting device 10. Specifically, mobile device 20 receives visible light emitted by transmitting device 10, and obtains a current location of mobile device 20, based on information included in the visible light. Mobile device 20 outputs guidance information for guiding user 2 from the current location to a destination.

Mobile device 20 is a mobile information terminal such as a mobile phone, smart phone, tablet, etc. Alternatively, mobile device 20 may be anything that user 2 carries, examples of which include a wearable terminal such as a smart watch, and a white cane for a visually impaired person.

Server device 30 performs wireless communications with mobile device 20. Server device 30 receives a guidance request from mobile device 20 and transmits guidance information to mobile device 20 as a response to the guidance request.

In the present embodiment, server device 30 further performs communications with management device 40. Server device 30 transmits status information that is based on the guidance request received from mobile device 20 to management device 40. The status information indicates the current location of user 2 and current time, for example.

It should be noted that server device 30 may also function as a management device in guidance system 1 and provide mobile device 20 with an execution program (application) of guidance system 1, for example. Server device 30 is, for example, a computer or the like.

Management device 40 is an electronic device installed at a facility, for example. The facility is a place where a plurality of users 2 congregate, examples of which include a structure such as a stadium (sports arena) and a theater, a park, a plaza, and a bathing beach. To be more specific, the facility is a place which can be a destination of users 2.

Management device 40 communicates with server device 30. Management device 40 receives, from server device 30, the status information which is based on the guidance request. Based on the status information, management device 40 estimates an expected arrival time of user 2. Management device 40 estimates expected arrival times of a plurality of users 2, thereby inferring a status of attendance of customers to the facility. Management device 40 is, for example, a computer or the like.

In the following, the components included in guidance system 1 are described in detail.

[Transmitting Device]

Figure 3:
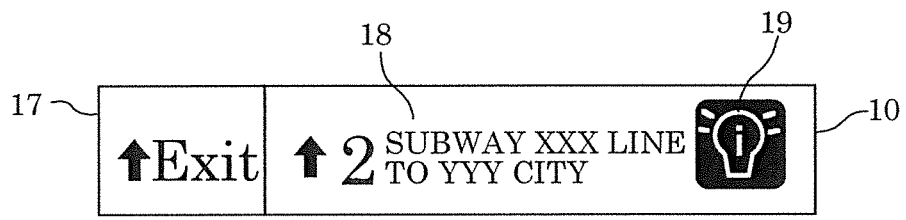
FIG. 3 is an external view of a guidance display surface of a transmitting device according to the embodiment.

First, transmitting device 10 is described with reference to FIGS. 3 to 6, besides FIG. 2. FIG. 3 is an external view of a guidance display surface of transmitting device 10 according to the present embodiment.

As shown in FIG. 2, transmitting device 10 includes light source 11, controller 12, storage 13, and communications circuit 16. Storage 13 is storing visible light ID 14 and service information 15. Moreover, as shown in FIG. 3, transmitting device 10 further includes housing 17, guidance display 18, and mark 19.

Light source 11 emits the light for visible light communications which includes the predetermined information. In the present embodiment, the predetermined information includes identification information unique to transmitting device 10, and customer service information.

The unique identification information is, specifically, visible light ID 14 stored in storage 13. Visible light ID 14 is identification information such as a serial number pre-assigned to transmitting device 10, or location information indicating a location at which transmitting device 10 is installed.

The customer service information is, specifically, service information 15 stored in storage 13. Service information 15 is, by way of example, customer service information depending on the location where transmitting device 10 is installed. Service information 15 contains information useful for a user of guidance system 1. Specifically, service information 15 contains information useful for user 2 who is the owner of mobile device 20, or the installer of transmitting device 10. For example, in the case where transmitting device 10 is an illumination device installed in a store, service information 15 is information indicating, for example, bargain items of the store. It should be noted that service information 15 may be information that can be updated by the installer of transmitting device 10. Examples of the installer include a store owner and a store employee of a store where transmitting device 10 is installed.

Light source 11, for example, includes a plurality of light emitting diodes (LED) connected in series. The visible light (illumination light) emitted by light source 11 is, but not particularly limited to, white light, for example. By emitting the illumination light, light source 11 repeatedly transmits service information 15 and visible light ID 14 which are superimposed on the illumination light.

Light source 11, for example, transmits a frame which includes visible light ID 14 and service information 15 repeatedly at regular intervals. Each frame is fixed-length data which includes a preamble indicating the beginning of the frame, type information indicating a type of the frame, payload indicating arbitrary information (here, visible light ID 14 and service information 15), and error detection code (e.g., cyclic redundancy check (CRC) code) of the frame.

Controller 12 controls light source 11. Controller 12 includes a non-volatile memory storing a program, a volatile memory which is a temporary storage area for executing the program, an input-output port, a processor which executes the program, etc. Controller 12 is, for example, a microcontroller.

In the present embodiment, controller 12 superimposes visible light ID 14 and service information 15 on the illumination light. For example, controller 12 controls turning on and off of at least one of the plurality of LEDs included in light source 11. This changes an amount of current through the plurality of LEDs, causing variations in brightness of the illumination light. Controller 12 uses visible light ID 14 read out from storage 13 to control turning on and off of the at least one LED, thereby transmitting visible light ID 14 in a form of the variations in brightness of the illumination light. In other words, visible light ID 14 is superimposed on the illumination light. Service information 15 is superimposed on the illumination light in the same manner.

Specifically, controller 12 uses N (an integer equal to or greater than 2) pulse position modulation (PPM) as light intensity modulation. For example, in 4 PPM, one symbol having a certain length in time represents two bits. The modulation method and others used for the visible light communications are standardized, for example, by CP-1223 "Visible Light Beacon System" by the Japan Electronics and Information Technology Industries Association (JEITA).

It should be noted that service information 15 may be superimposed on illumination light during a period of time after transmitting device 10 receives a presence signal from mobile device 20. This allows service information 15 to be provided only to user 2 who utilizes guidance system 1. Alternatively, service information 15 may not be stored in storage 13. Stated differently, service information 15 may not be transmitted by visible light communications.

If communications circuit 16 receives a presence signal, controller 12 causes communications circuit 16 to transmit notification information for notifying the presence of transmitting device 10. The notification information is, for example, information indicating the location where transmitting device 10 is installed.

The notification information is, for example, an image for notifying the presence of transmitting device 10. Alternatively, the notification information may be audio guidance for notifying the presence of transmitting device 10. The notification information may contain the image and the audio guidance. The notification information may include an instruction for vibrating mobile device 20 to notify the presence of transmitting device 10.

Storage 13 is a memory storing visible light ID 14 and service information 15. Storage 13 is, for example, a non-volatile memory such as flash memory.

Communications circuit 16 performs wireless communication not including visible light communication and transmits a wireless signal for the purpose of determining a presence of a device that has received the wireless signal. The wireless signal may be, for example, a radio beacon. Communications circuit 16 continuously (periodically), repeatedly transmits a wireless signal. The wireless signal is received by mobile device 20 passing nearby transmitting device 10 and which can in turn respond by transmitting a presence signal.

Communications circuit 16 receives a presence signal which indicates presence of a predetermined device. For example, communications circuit 16 receives a presence signal from a device (i.e., mobile device 20) that has received the wireless signal. The presence signal includes, for example, identification information unique to mobile device 20. If communications circuit 16 receives the presence signal, communications circuit 16 transmits the notification information to mobile device 20 as a response to the presence signal.

Communications circuit 16 is a communication interface which performs near-field communications. In the present embodiment, the coverage of the near-field communications is within a few meters. Specifically, communications circuit 16 utilizes a radio frequency identifier (RFID) to perform the wireless communications. For example, communications circuit 16 includes a tag or a reader.

Housing 17 covers light source 11. Specifically, light source 11, controller 12, storage 13, and communications circuit 16 are accommodated in housing 17. In the present embodiment, housing 17 is a sign (panel-shape d) housing.

As illustrated in FIG. 1, guidance display 18 is provided on one surface of housing 17. The surface having guidance display 18 is light transmissive and the light for visible light communications that is emitted from light source 11 accommodated in housing 17 transmits through the surface. Although not shown, a guidance display may be provided on a surface of housing 17 opposite the surface on which guidance display 18 is provided.

Housing 17 is formed of a light-transmissive resin material such as acrylic (PMMA) and polycarbonate (PC), for example. It should be noted that portions of housing 15, other than the surface on which guidance display 18 is provided, may not be light transmissive and thus may be formed of, for example, a light-proof metallic material such as aluminum.

Guidance display 18 is a sign indicating a direction leading to a predetermined place or the like for providing user 2 with directions. Examples of the predetermined place include landmarks such as stations, parks, and buildings, and administrative districts of municipalities and prefectures. Guidance display 18 may be printed a surface of housing 17. Alternatively, guidance display 18 may be a plastic film or a paper that has an adhesive material on the back, such as a sticker and a label.

Mark 19 is provided on the surface on which guidance display 18 is provided. Mark 19 indicates, for example, that transmitting device 10 transmits light for visible light communications.

Figure 4:
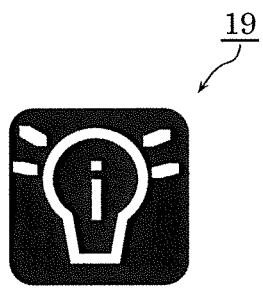
FIG. 4 is a diagram illustrating an example of a mark according to the embodiment.

FIG. 4 is a diagram illustrating mark 19 according to the present embodiment. As illustrated in FIG. 4, mark 19 depicts a schematized drawing of a bulb lamp in a filled rectangle having rounded corners (generally square). A character "i" is drawn in the center of the drawing of the bulb lamp. Four oblique lines indicating emission of visible light are drawn around the drawing of the bulb lamp. All the drawings of the bulb lamp, the character "i," and the four oblique lines are in either white or transparent and transmits therethrough the illumination light from light source 11 accommodated in housing 17. Thus, for example, video data (light signal) which is obtained by capturing a video of mark 19 contains the predetermined information such as visible light ID 14.

Figure 5:
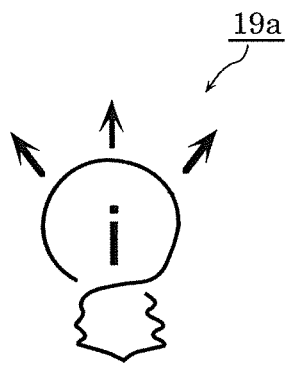
FIG. 5 is a diagram illustrating another example of the mark according to the embodiment.

It should be noted that the shape, size, pattern of the mark on the guidance display surface are not particularly limited. FIG. 5 is a diagram illustrating another example of the mark according to the present embodiment. Mark 19a illustrated in FIG. 5 is a schematized drawing of a bulb lamp in color such as black. A character "i" is drawn in the center of the drawing of the bulb lamp. Three arrows indicating emission of visible light are drawn around the drawing of the bulb lamp.

Figure 6:
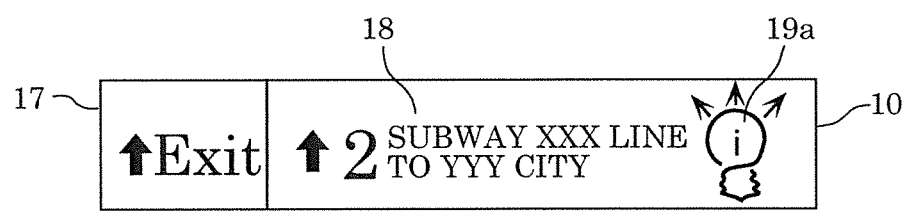
FIG. 6 is an external view of a guidance display surface, on which the mark illustrated in FIG. 5 is provided, of the transmitting device.

FIG. 6 is an external view of a guidance display surface of transmitting device 10 on which mark 19a illustrated in FIG. 5 is made. As illustrated in FIG. 6, mark 19a is provided on the guidance display surface of transmitting device 10, instead of mark 19 illustrated in FIG. 3. It should be noted that if transmitting device 10 has a plurality of guidance display surfaces, different marks may be provided on the respective guidance display surfaces.

Marks 19 and 19a may be printed on guidance display surfaces of housing 17. Alternatively, marks 19 and 19a may be plastic films or papers that have an adhesive material on the back, such as stickers and labels.

[Mobile Device]

Next, mobile device 20 is described with reference to FIG. 2.

As shown in FIG. 2, mobile device 20 includes capturer 21, controller 22, receiver 23, communications circuit 24, output 25, and storage 28.

Capturer 21 is by way of example a light receiver which receives the light emitted by transmitting device 10. The light emitted by transmitting device 10 is the light for visible light communications which includes the predetermined information. Capturer 21 receives the light for visible light communications by capturing a video of a surface of transmitting device 10 on which guidance display 18 is provided.

Capturer 21, for example, includes a lens, an image sensor, etc. Capturer 21 outputs captured video data to controller 22. The video data includes the light for visible light communications.

Controller 22 controls the components which constitute mobile device 20. Controller 22 includes a non-volatile memory storing a program, a volatile memory which is a temporary storage area for executing the program, an input-output port, a processor which executes the program, etc.

If communications circuit 24 receives a wireless signal by wireless communications from transmitting device 10 emitting the light for visible light communications, controller 22 causes output 25 to output the notification information for notifying the presence of transmitting device 10. Specifically, controller 22 generates a presence signal indicating the presence of mobile device 20 if first wireless communications circuit 24a included in communications circuit 24 receives a wireless signal. Controller 22 transmits the presence signal to transmitting device 10 via communications circuit 24. Controller 22 receives from transmitting device 10 via communications circuit 24 the notification information as a response to the presence signal, and causes output 25 to output the notification information.

Controller 22 further obtains the location of transmitting device 10 based on the predetermined information included in the light received by capturer 21, and updates the guidance information with the obtained location as a new current location. In the present embodiment, updating the guidance information refers to obtaining new guidance information from server device 30.

Specifically, controller 22 extracts visible light ID 14 from the light received by capturer 21, and transmits a guidance request which includes visible light ID 14 to server device 30 via communications circuit 24. Controller 22 receives guidance information as a response to the guidance request from server device 30 via communications circuit 24. Controller 22, for example, stores the guidance information into storage 28 and outputs the guidance information to output 25. If guidance information is already stored in storage 28, at which time, if output 25 has output guidance information, controller 22 updates old guidance information with new guidance information received from server device 30.

It should be noted that if communications circuit 24 receives arrival information, controller 22 generates an arrival confirmation screen (or audio for confirmation) for confirming with user 2 that user 2 has arrived at the destination, and outputs the confirmation screen to output 25. The arrival information is by way of example of the guidance information and indicates that the current location is the destination.

Receiver 23 is a user interface which receives manipulation from user 2. Receiver 23 receives input of a destination from user 2. Receiver 23 outputs to controller 22 destination information indicating the destination input by user 2. Receiver 23 may further receive from user 2 an indication directed to capturer 21 to capture a video and an indication for launching a guidance program, for example. Alternatively, receiver 23 may receive input of the current location from user 2. For example, if visible light communication is unavailable, controller 22 may include information indicating the current location received from user 2 as current location information into the guidance request.

Receiver 23 is, for example, a touch-panel display. Alternatively, receiver 23 may be physical buttons on the housing of mobile device 20. Receiver 23 may include audio input means such as a microphone.

Communications circuit 24 performs wireless communication not including visible light communication. As shown in FIG. 2, communications circuit 24 includes first wireless communications circuit 24a and second wireless communications circuit 24b.

First wireless communications circuit 24a receives a wireless signal by near-field communications. First wireless communications circuit 24a further transmits a presence signal to transmitting device 10, and receives notification information as a response to the presence signal. Specifically, first wireless communications circuit 24a transmits the presence signal if the wireless signal is received from communications circuit 16.

First wireless communications circuit 24a utilizes, for example, RFID to perform the near-field communications. For example, first wireless communications circuit 24a includes a tag or a reader.

Second wireless communications circuit 24b transmits a request for guidance information (guidance request), and obtains the guidance information as a response to the request. The guidance request includes destination information which indicates the destination and visible light ID 14. The guidance request may further include identification information that is unique to and for identifying mobile device 20.

Second wireless communications circuit 24b receives the guidance information for guiding user 2 to the destination, from server device 30 as a response to the guidance request. The guidance information, specifically, includes a map (guidance map) showing at least a portion of a route from the current location of mobile device 20 to the destination. Examples of the map include not only road maps, topographic maps, etc., but also floor maps. Alternatively, the guidance information may include audio guidance which guides the route from the current location to the destination.

Second wireless communications circuit 24b is, for example, a communications interface such as a transceiver and antenna for wireless communications. Second wireless communications circuit 24b performs wireless communications with communications circuit 34 included in server device 30. Second wireless communications circuit 24b performs the wireless communications based on a wireless communication standard, such as Wi-Fi or long term evolution (LTE), for example.

Output 25 outputs the guidance information for guiding user 2 from the current location to the destination. As shown in FIG. 2, output 25 includes audio output 26 and display 27.

Audio output 26 outputs audio guidance included in the guidance information. Audio output 26 may output audio guidance included in the notification information. Audio output 26 is, for example, a loudspeaker.

Display 27 displays the map included in the guidance information. Display 27 may display an image included in the notification information. Display 27 is, for example, a touch-panel display. It should be noted that output 25 may include a vibrator for vibrating mobile device 20. If the notification information received by first wireless communications circuit 24a includes the indication for vibrating mobile device 20, the vibrator may vibrate the housing of mobile device 20.

Storage 28 is a memory for storing the execution program of guidance system 1, etc. Storage 28 is, for example, a non-volatile memory such as flash memory.

Storage 28 may store the video data captured by capturer 21. Alternatively, storage 28 may store, for example, visible light ID 14, service information 15, the notification information, etc. Also, storage 28 may store the guidance information transmitted from server device 30.

[Server Device]

Next, server device 30 is described with reference to FIG. 2.

As shown in FIG. 2, server device 30 includes storage 31, communications circuit 34, and controller 35.

Storage 31 is a memory for storing correspondence table 32 and destination registration information 33. Storage 31 is, for example, a non-volatile memory, such as a hard disk drive (HDD), flash memory, etc.

Figure 7:
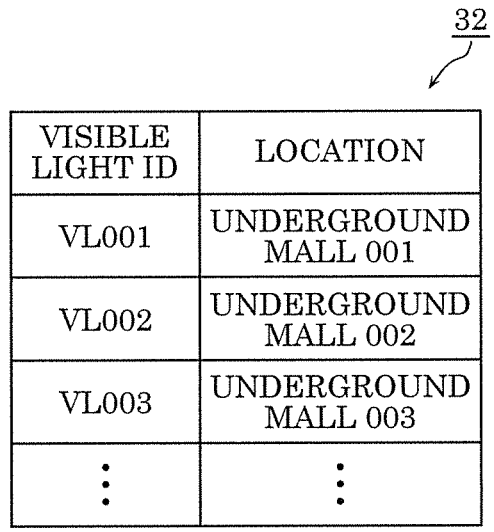
FIG. 7 is a diagram illustrating an example of a correspondence table according to the embodiment.

In correspondence table 32, the predetermined information included in the light for visible light communications and the location of the transmitting device are associated. FIG. 7 is a diagram illustrating an example of correspondence table 32 according to the present embodiment.

As illustrated in FIG. 7, in correspondence table 32, each visible light ID is associated with the installed location of transmitting device 10 corresponding to the visible light ID. For example, correspondence table 32 illustrated in FIG. 7 indicates that a transmitting device assigned a visible light ID of "VL001" is installed at a location indicated by "UNDERGROUND MALL 001."

Destination registration information 33 is a table in which destinations which user 2 can register and management devices 40, which are electronic devices installed at the destinations, are associated with one another. Management device 40, for example, manages destination facilities (i.e., sports arena).

Figure 8:
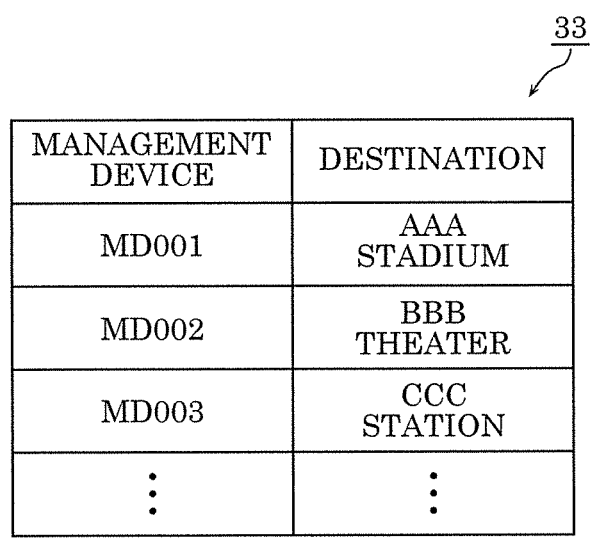
FIG. 8 is a diagram showing an example of destination registration information according to the embodiment.

FIG. 8 is a diagram showing an example of destination registration information 33 according to the present embodiment. Destination registration information 33 shown in FIG. 8 indicates, for example, that a management device assigned an identification number of "MD001" is installed in "AAA STADIUM." Destination registration information 33 is updated by controller 35 based on a request from management device 40.

Communications circuit 34 receives the guidance request which includes the predetermined information and the destination information which indicates a destination. Communications circuit 34 further transmits the guidance information to mobile device 20.

Communications circuit 34 is, for example, a communications interface such as a transceiver and antenna for wireless communications. Communications circuit 34 performs wireless communications not including visible light communication, specifically, with second wireless communications circuit 24b included in mobile device 20. The wireless communication is based on a wireless communication standard, such as Wi-Fi or LTE, for example.

In the present embodiment, communications circuit 34 further performs wireless communications with communications circuit 41 included in management device 40. Specifically, communications circuit 34 transmits status information based on the guidance request to management device 40 installed at the destination indicated by the destination information. For example, communications circuit 34 transmits status information to management device 40 if controller 35 generates guidance information.

The status information, specifically, includes the current location of user 2 (mobile device 20) and current time. The status information may be guidance information. Stated differently, communications circuit 34 may transmit guidance information to both mobile device 20 and management device 40.

Controller 35 determines, by reference to correspondence table 32, a current location of transmitting device 10 based on the predetermined information included in the guidance request, and generates, as guidance information, information which indicates a route from the current location to the destination indicated by the destination information. Controller 35 transmits the guidance information to mobile device 20 via communications circuit 34. It should be noted that if the guidance request includes the current location information, rather than visible light ID 14, controller 35 may determine, as a current location, a current location that is indicated by the current location information included in the guidance request, without reference to correspondence table 32.

Controller 35 further generates status information if communications circuit 34 receives a guidance request. Controller 35 transmits the status information to management device 40 via communications circuit 34. Controller 35 may transmit status information each time communications circuit 34 receives a guidance request. Alternatively, controller 35 may transmit a plurality of status information items collectively at predetermined timings (e.g., periodically). For example, controller 35 may transmit unsent status information items collectively if received a request for status information from management device 40 via communications circuit 34.

In the present embodiment, controller 35 further associates management device 40 and a destination, based on a registration request from management device 40, and stores the association as destination registration information 33 into storage 31.

Although not shown, storage 31 may store history information of user 2 (mobile device 20). The history information is information in which a destination indicated by destination information included in a guidance request, a visible light ID (or, a corresponding current location), and current time are associated for a device ID of each mobile device 20.

Storing the history information into storage 31 allows server device 30 to make sure whether user 2 is properly advancing to the destination, that is, whether guidance system 1 is properly guiding user 2. This improves the accuracy of the guidance information transmitted by controller 35. For example, if user 2 is not following a correct route, controller 35 generates a more detailed map (large scale map) which is to be included in guidance information.

[Management Device]

Next, management device 40 is described with reference to FIG. 2.

As shown in FIG. 2, management device 40 includes communications circuit 41, controller 42, storage 43, and output 45. Storage 43 is storing customer attendance information 44.

Communications circuit 41 receives the status information from server device 30. The status information received from server device 30 is passed to controller 42 and reflected to customer attendance information 44.

Communications circuit 41 is, for example, a communications interface such as a transceiver and antenna for wireless communications. Communications circuit 41 performs wireless communications with communications circuit 34 included in server device 30. The wireless communication is based on a wireless communication standard, such as Wi-Fi or LTE, for example. It should be noted that communications circuit 41 may perform wired communications with server device 30. Stated differently, communications circuit 41 may be a communications interface connectable to a communications cable such as an optical fiber.

Controller 42 updates customer attendance information 44, based on the status information received by communications circuit 41. Specifically, controller 42 estimates a time at which and a direction from which user 2 would arrive at a facility, from the current location and the current time which are included in the status information.

For example, controller 42 calculates a time required for user 2 at the current location to arrive at the facility, from a distance from the current location of user 2 to the facility and adds the time to the current time, thereby calculating an expected arrival time. It should be noted that the time required may be calculated using, for example, information on transportation that is available from the current location to the facility, or a speed of travel (walking speed) of user 2. The speed of travel of user 2 may be, for example, an adult's general walking speed, or may be calculated based on travel history of user 2. The travel history of user 2 is determined based on, for example, a plurality of status information items from the same user 2 (mobile device 20). Alternatively, if history information is stored in storage 31 included in server device 30, controller 42 may calculate a speed of travel of user 2, based on the history information.

Controller 42 also estimates a direction in which user 2 would arrive at the facility, from the positional relationship between the current location of user 2 and the facility. For example, controller 42 estimates the direction of the current location of user 2 relative to the facility as an expected direction of arrival. Specifically, if user 2 is located on the west side of the facility, controller 42 estimates the expected direction of arrival to be west.

It should be noted that the expected direction of arrival may be, for example, information (i.e., an expected arrival gate) which indicates a gate (entrance) of the facility. This allows controller 42 to estimate which user would arrive at what time at which gate, if the facility has a plurality of gates. The estimation is stored into customer attendance information 44 in storage 43.

Storage 43 is a memory for storing customer attendance information 44. Storage 43 is, for example, a non-volatile memory, such as a HDD, flash memory, etc.

Customer attendance information 44 is information on how a plurality of users 2 (mobile device 20) congregate in a facility where management device 40 is installed. Specifically, customer attendance information 44 is a database in which an expected time of arrival at the facility and an expected arrival location are associated for each mobile device 20 (user 2).

FIG. 9 is a diagram illustrating an example of customer attendance information 44 according to the present embodiment. As shown in FIG. 9, a current time, current location, expected arrival time, and expected arrival gate are associated for each device ID in customer attendance information 44.

The device ID is identification information unique to mobile device 20. The device ID is, for example, information in a guidance request transmitted from mobile device 20 to server device 30. Controller 35 included in server device 30 transmits a device ID included in a guidance request to management device 40 as a part of status information, thereby allowing controller 42 to identify mobile device 20 that is the sender of the status information.

The current time is, for example, a time at which mobile device 20 transmits a guidance request, or a time at which server device 30 receives a guidance request. If server device 30 transmits status information to management device 40 every time server device 30 receives a guidance request, the current time may be a time at which server device 30 transmits status information to management device 40, or a time at which management device 40 receives status information.

The current location is where mobile device 20 is present, and determined based on visible light ID 14 included in a guidance request.

The expected arrival time is a time at which controller 42 estimates user 2 to arrive at a facility. The expected arrival gate is by way of example of the expected direction of arrival estimated by controller 42, and is information which indicates one of gates of the facility.

Figure 10:
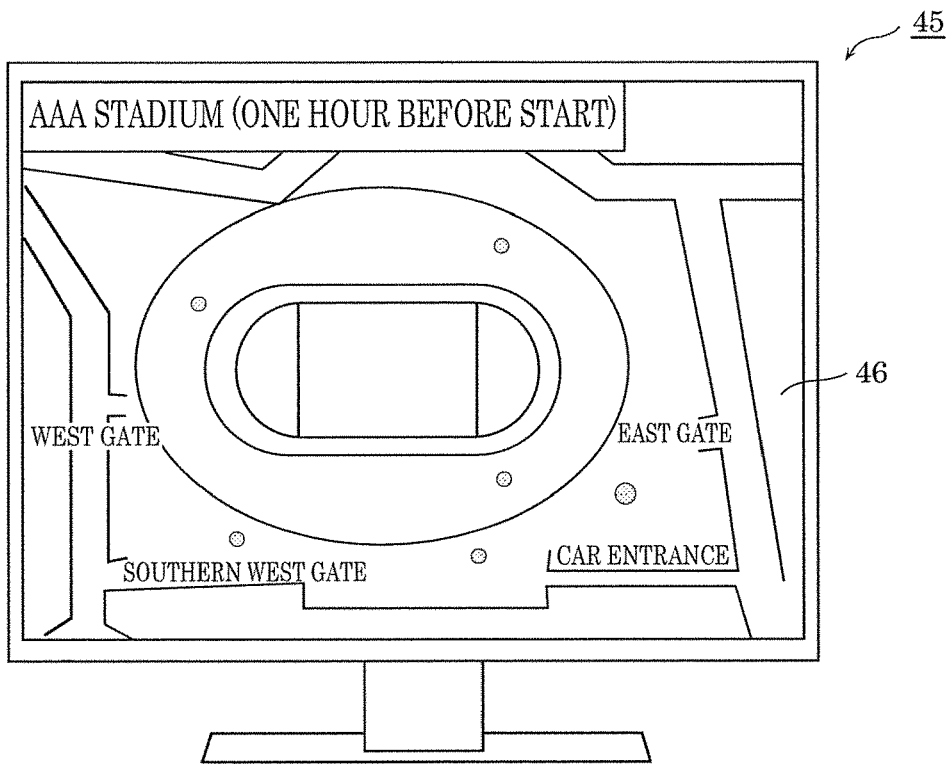
FIG. 10 is a diagram illustrating an expected customer attendance image one hour prior to the start of a game at a facility according to the embodiment.
Figure 11:
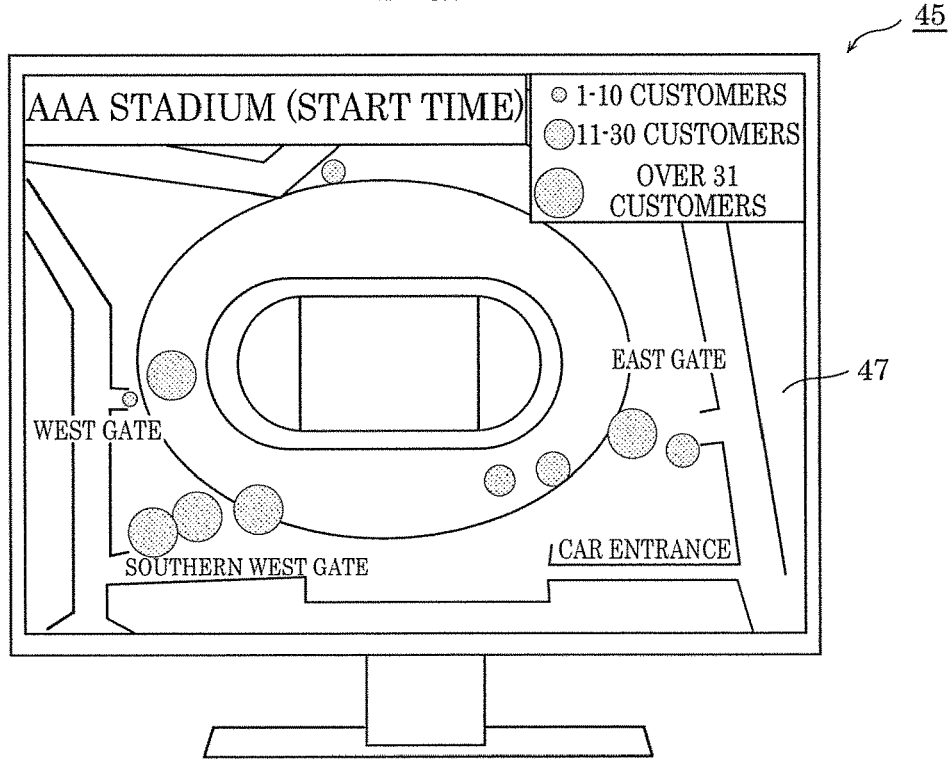
FIG. 11 is a diagram illustrating an expected customer attendance image at the start of a game at a facility according to the embodiment.

Output 45 outputs customer attendance information 44. Specifically, as illustrated in FIGS. 10 and 11, output 45 is a display and displays expected customer attendance image 46 or 47 which indicates customer attendance information 44. FIG. 10 is a diagram illustrating expected customer attendance image 46 one hour prior to the start of a game at a facility according to the present embodiment. FIG. 11 is a diagram illustrating expected customer attendance image 47 at the start of a game at a facility according to the present embodiment.

Expected customer attendance images 46 and 47 are images each showing an expected status of attendance of customers at a predetermined time. The predetermined time may be a current time or may be, for example, a predetermined time in the future (i.e., start time of an event such as a sports game or a concert). Expected customer attendance images 46 and 47 are generated by, for example, controller 42.

As illustrated in FIGS. 10 and 11, expected customer attendance images 46 and 47 indicate the number of people by a size of a circle on a schematic plan view of a facility ("AAA STADIUM"). It should be noted that the expected customer attendance image output by output 45 is not particularly limited, and, for example, customer attendance information 44 may be displayed instead. Alternatively, a total number of people at each gate may be output in a chart.

While controller 42 included in management device 40 estimates the expected arrival time and the expected direction of arrival in the present embodiment, it should be noted that server device 30 may estimate the expected arrival time and the expected direction of arrival and transmit them as a part of status information to management device 40.

[Operation (Guidance Method)]

Next, operation of guidance system 1 according to the present embodiment, that is, the guidance method is described. The guidance method according to the present embodiment utilizes visible light communications to guide user 2 to a destination.

[Operation of Mobile Device]

Figure 12:
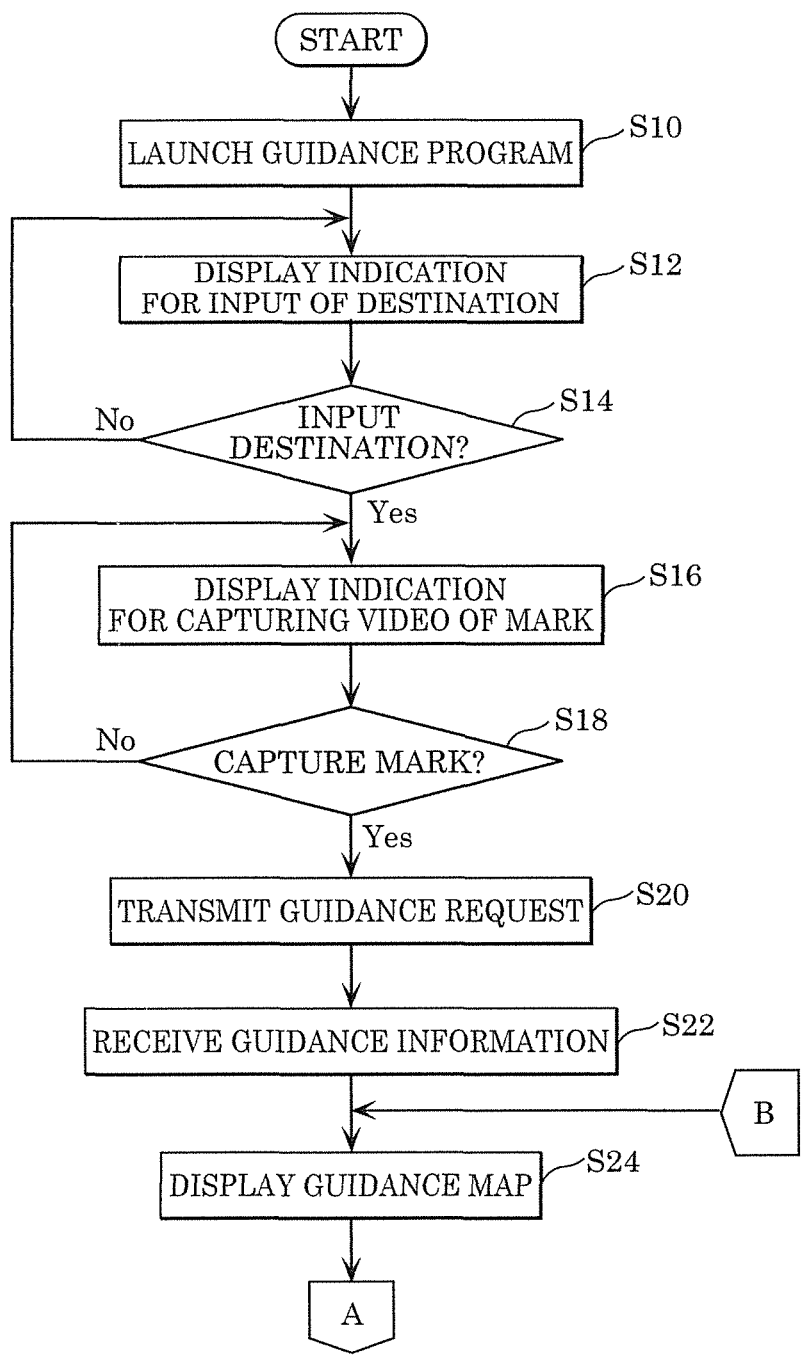
FIG. 12 is a flowchart illustrating operation of a mobile device according to the embodiment.
Figure 13:
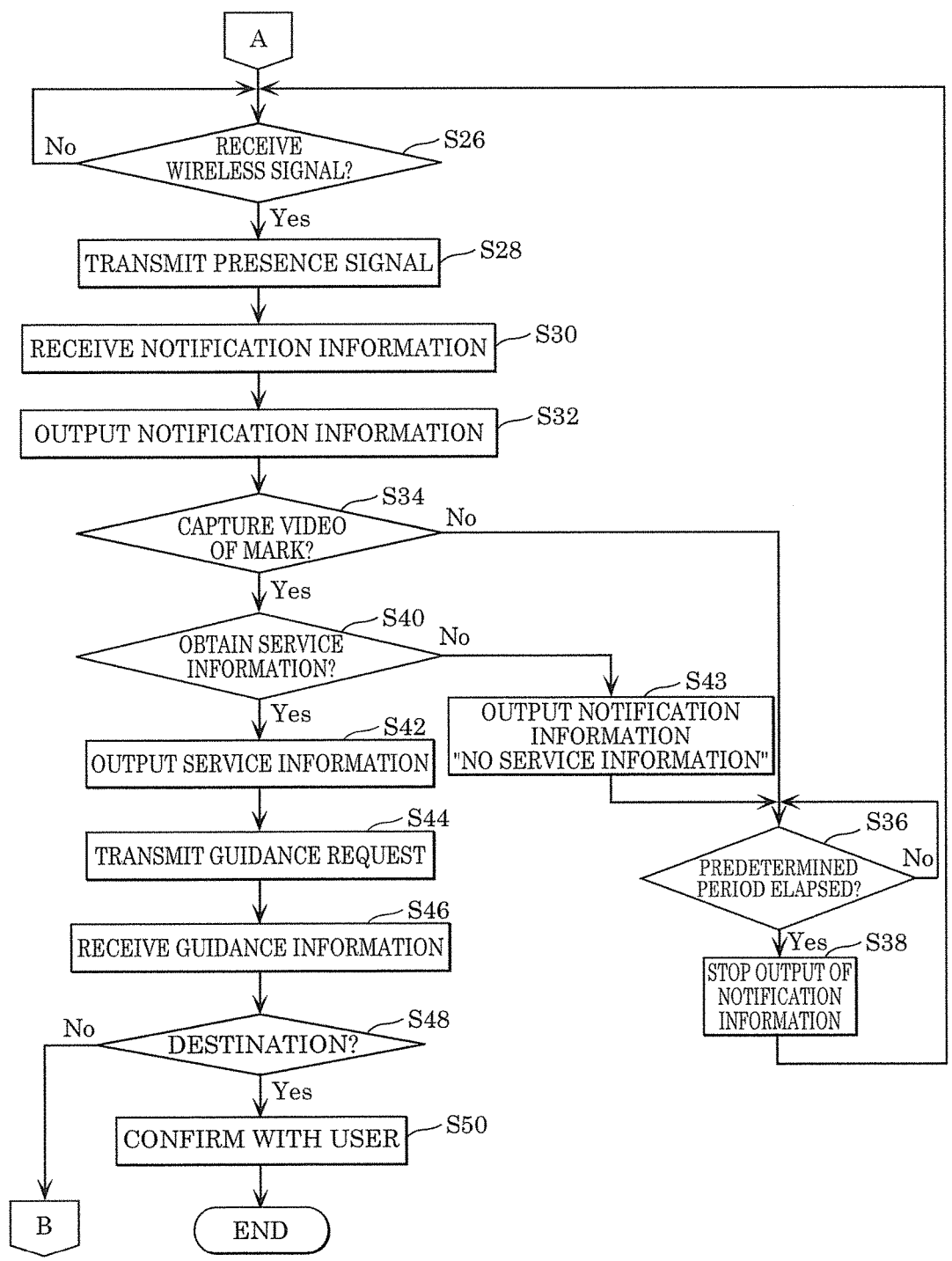
FIG. 13 is a flowchart illustrating operation of the mobile device according to the embodiment.

In the following, operation of mobile device 20 is initially described with reference to FIGS. 12 and 13. FIGS. 12 and 13 are flowcharts illustrating operation of mobile device 20 according to the present embodiment.

First, controller 22 launches the guidance program (S10). For example, if receiver 23 receives an indication for launching the guidance program from user 2, controller 22 loads the guidance program from storage 28 and executes it.

Figure 14:
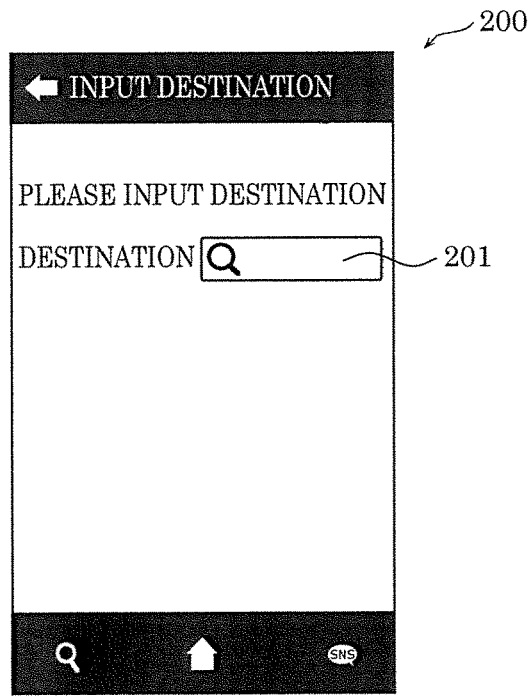
FIG. 14 is a diagram showing a destination input screen displayed on the display included in the mobile device according to the embodiment.

Next, controller 22 causes display 27 to display an indication for input of a destination (S12). FIG. 14 is a diagram showing destination input screen 200 displayed on display 27 included in mobile device 20 according to the present embodiment.

Destination input screen 200 includes text box 201. User 2 inputs a destination to text box 201, using a software keyboard, audio input means, or the like. If user 2 does not input a destination (No in S14), the processing returns to step S12 and controller 22 continues to display destination input screen 200.

Figure 15:
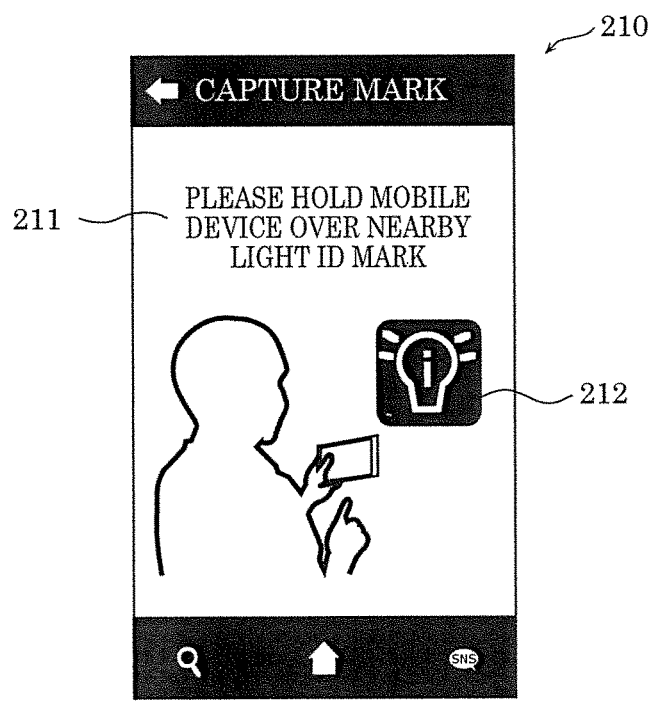
FIG. 15 is a diagram illustrating a capture indication screen displayed on the display included in the mobile device according to the embodiment.

If user 2 inputs a destination (Yes in S14), controller 22 causes display 27 to display an indication for capturing a video of a mark (S16). FIG. 15 is a diagram illustrating capture indication screen 210 displayed on display 27 included in mobile device 20 according to the present embodiment.

For example, text 211 indicating an action that user 2 should take is included in capture indication screen 210. Specifically, text 211 is for prompting user 2 to capture a video of mark 19. Image 212 indicating an example of mark 19 to be captured is further included in capture indication screen 210. This allows user 2 to know a mark that user 2 should capture a video of by seeing capture indication screen 210, thereby allowing user 2 to correctly capture a video of mark 19.

It should be noted that a launch button for launching capturer 21 may be included in capture indication screen 210. For example, controller 22 may launch capturer 21 if receiver 23 detects depression of the launch button.

Figure 16:
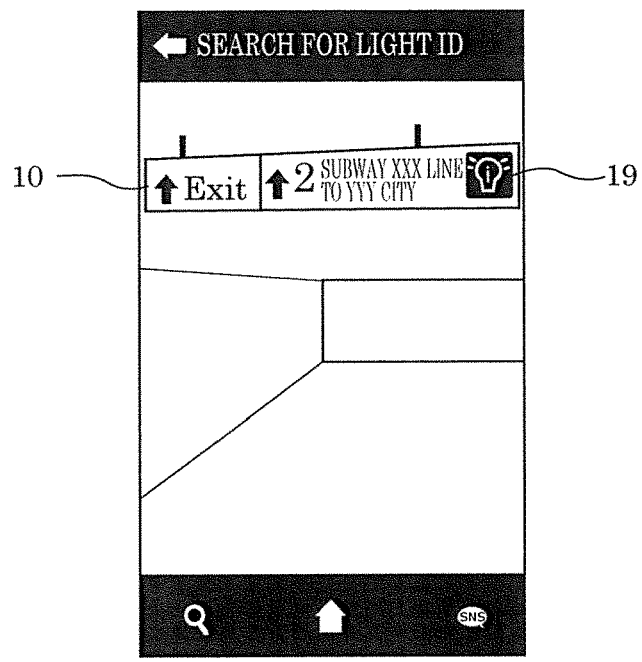
FIG. 16 is a diagram showing a video captured by a capturer and displayed on the display included in the mobile device according to the embodiment.

FIG. 16 is a diagram showing a video captured by capturer 21 and displayed on display 27 included in mobile device 20 according to the present embodiment. Capturer 21 receives light (video data) emitted by transmitting device 10 by capturing a video of mark 19 on transmitting device 10. Controller 22 extracts visible light ID 14 from the video data. If user 2 does not capture a video of mark 19 (No in S18), the processing returns to step S16 and controller 22 continues to display capture indication screen 210.

Next, if user 2 captures a video of mark 19 (Yes in S18), controller 22 transmits a guidance request to server device 30 via second wireless communications circuit 24b (S20). The guidance request includes visible light ID 14 and destination information which indicates the destination input by user 2 via destination input screen 200.

Next, controller 22 receives guidance information from server device 30 via second wireless communications circuit 24b as a response to the guidance request (S22). The guidance information includes a map which includes at least a portion of a route from the current location to the destination.

Figure 17:
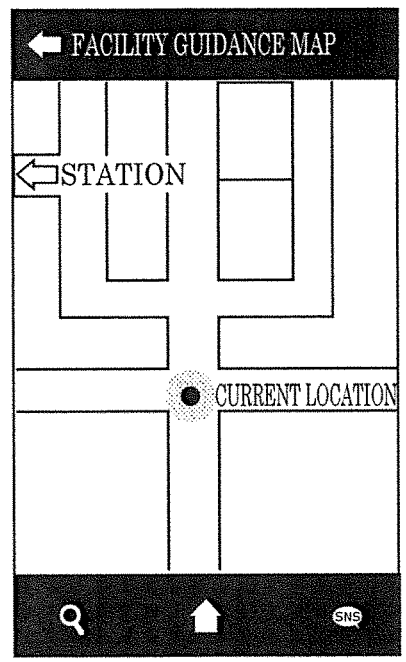
FIG. 17 is a diagram depicting a map (guidance information) displayed on the display included in the mobile device according to the embodiment.

Next, controller 22 causes display 27 to display a guidance map (guiding map) (S24). FIG. 17 is a diagram depicting the map (guidance information) displayed on display 27 included in mobile device 20 according to the present embodiment.

The map displayed on display 27 shows the current location substantially in the center, for example. The map indicates a direction to the destination ("STATION" in the example depicted in FIG. 14) by an open arrow.

It should be noted that the guidance information may include audio data instead of or in addition to the map. In this case, controller 22 may cause audio output 26 to output the audio data included in the guidance information.

Since the map is displayed on display 27, user 2 can move toward the destination while looking at the map.

Next, as illustrated in FIG. 13, if first wireless communications circuit 24a receives a wireless signal (Yes in S26), controller 22 causes first wireless communications circuit 24a to transmit a presence signal (S28). Specifically, first wireless communications circuit 24a receives a wireless signal if user 2 passes nearby a predetermined location confirmation point. It should be noted that the location confirmation point may be shown on the map illustrated in FIG. 17.

Figure 18:
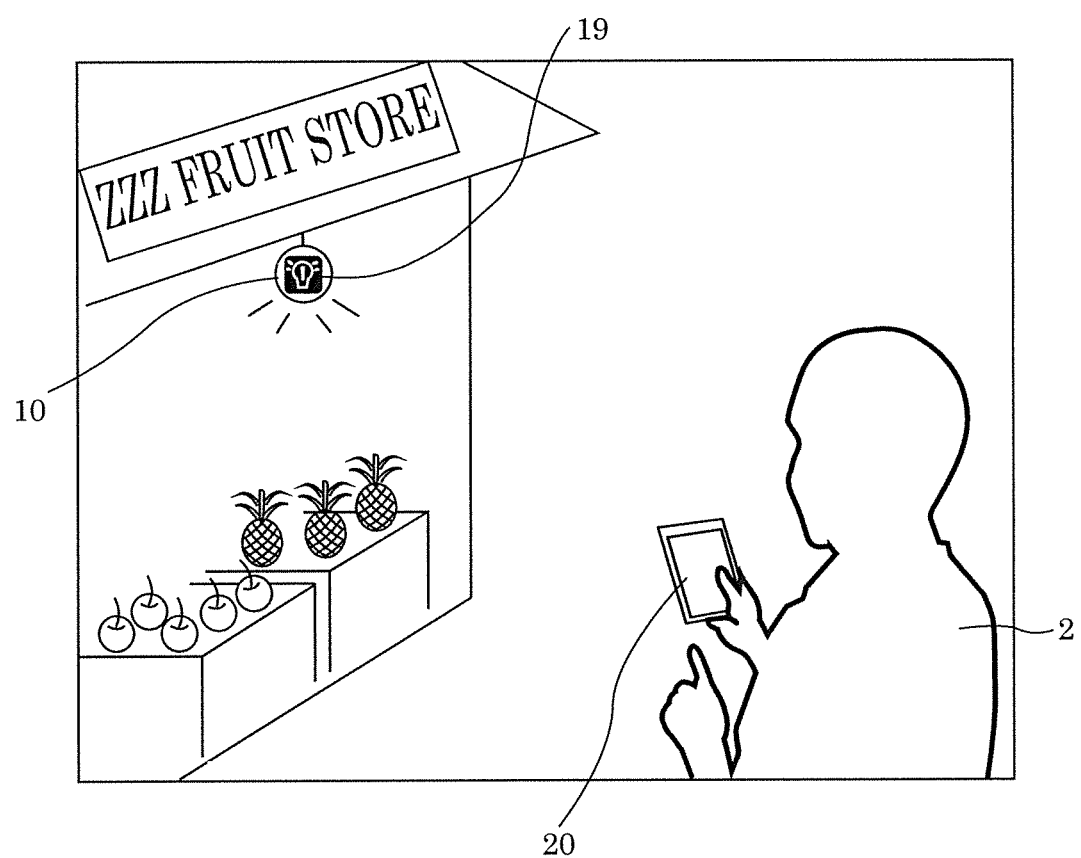
FIG. 18 is a diagram illustrating an example of a location confirmation point in the guidance system according to the embodiment.

FIG. 18 is a diagram illustrating an example of a location confirmation point in the guidance system according to the present embodiment. The location confirmation point is, specifically, a place where transmitting device 10 is installed. In the example illustrated in FIG. 18, the location confirmation point is "ZZZ FRUIT STORE," where transmitting device 10 is installed on the ceiling of the fruit store.

First wireless communications circuit 24a receives notification information from transmitting device 10 (S30). Output 25 outputs the notification information received by first wireless communications circuit 24a (S32). In the present embodiment, the notification information is an image which notifies presence of transmitting device 10. Thus, display 27 displays the image.

Figure 19:
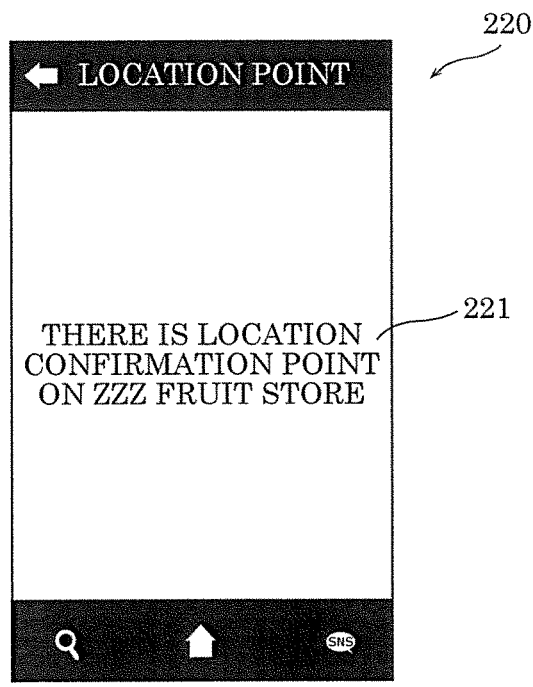
FIG. 19 is a diagram illustrating a notification screen displayed on the display included in the mobile device according to the embodiment.

FIG. 19 is a diagram illustrating notification screen 220 displayed on display 27 included in mobile device 20 according to the present embodiment. Notification screen 220 is a screen which includes the notification information, and, specifically, includes text 221 which indicates a specific installation location of transmitting device 10 that has transmitted the notification information.

User 2 is allowed to know the exact location of transmitting device 10 by notification screen 220 displayed on display 27. For example, since text 221 shows "THERE IS LOCATION CONFIRMATION POINT ON ZZZ FRUIT STORE," user 2 can readily find transmitting device 10 that is installed on the nearby "ZZZ FRUIT STORE." For example, if user 2 desires to know the current location, this allows user 2 to obtain the current location by visible light communications, by making user 2 operate mobile device 20 and cause capturer 21 to capture a video of transmitting device 10.

If user 2 does not capture a video of mark 19 (No in S34), controller 22 waits for a predetermined period to elapse (No in S36). If the predetermined period has elapsed (Yes in S36), controller 22 stops the output of the notification information (S38). For example, if user 2 is understanding the current location and decides that there is no need to check the current location at a moment, user 2 may move toward the destination, without checking the current location. For that reason, the processing returns to step S26, and controller 22 waits for the next wireless signal. Stated differently, controller 22 waits for user 2 to pass nearby the next location confirmation point.

If user 2 captures a video of mark 19 (Yes in S34), and if service information 15 is included in the visible light (Yes in S40), controller 22 causes output 25 to output service information 15 (S42).

Figure 20:
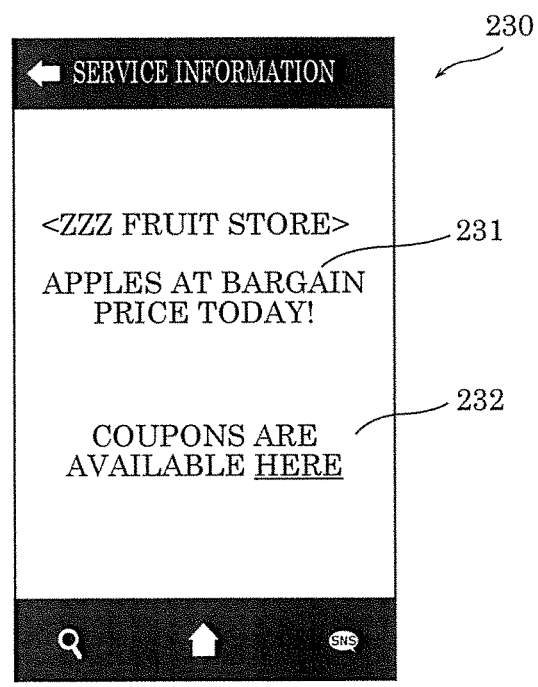
FIG. 20 is a diagram illustrating a service information screen displayed on the display included in the mobile device according to the embodiment.

FIG. 20 is a diagram illustrating service information screen 230 displayed on display 27 included in mobile device 20 according to the present embodiment. As illustrated in FIG. 20, service information screen 230 shows information on the installer (here, "ZZZ FRUIT STORE") of transmitting device 10. For example, service information screen 230 includes text 231 that indicates, for example, bargain items at "ZZZ FRUIT STORE." Also, service information screen 230 may include URL (Uniform Resource Locator) information 232 for access to coupons usable at "ZZZ FRUIT STORE."

If the visible light includes no service information 15 (No in S40), controller 22 causes output 25 to output notification information "NO SERVICE INFORMATION" (S43). For example, controller 22 causes display 27 to display textual information indicating that there is no service information (i.e., "NO SERVICE INFORMATION"). Then, after elapse of the predetermined period (Yes in S36), controller 22 stops the output of the notification information (S38).

After service information 15 is output, controller 22 transmits a guidance request to server device 30 via second wireless communications circuit 24b (S44). The guidance request includes destination information, and visible light ID 14 of transmitting device 10 installed at "ZZZ FRUIT STORE." If history information is stored in storage 31 included in server device 30 at this time, the guidance request may not include destination information.

Next, controller 22 receives guidance information from server device 30 via second wireless communications circuit 24b as a response to the guidance request (S46). If a current location indicated by the guidance information is the destination which user 2 has input (Yes in S48), that is, if obtained arrival information, controller 22 confirms with user 2 whether he/she has arrived at the destination (S50). Specifically, controller 22 generates an arrival confirmation screen based on the arrival information and causes display 27 to display the arrival confirmation screen.

Figure 21:
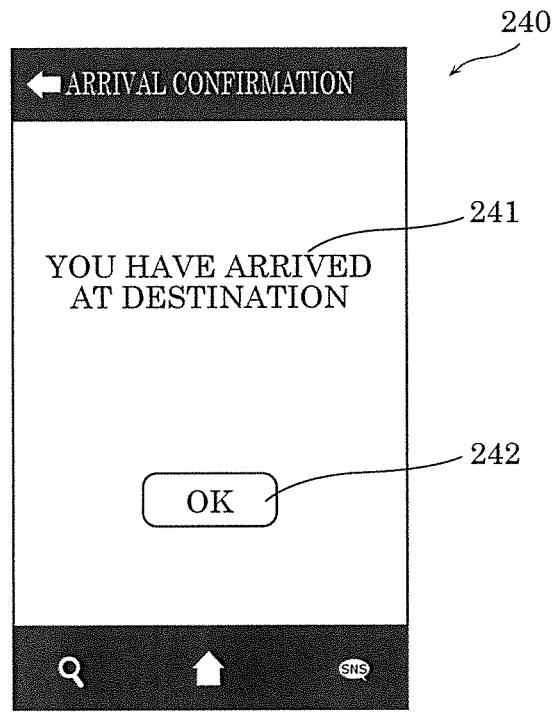
FIG. 21 is a diagram illustrating an arrival confirmation screen displayed on the display included in the mobile device according to the embodiment.

FIG. 21 is a diagram illustrating arrival confirmation screen 240 displayed on display 27 included in mobile device 20 according to the present embodiment. Arrival confirmation screen 240 includes text 241 which indicates that user 2 has arrived at the destination, and confirmation button 242. As receiver 23 detects that user 2 has depressed confirmation button 242, controller 22 ends the guidance program.

If the current location indicated by the guidance information is not the destination that user 2 has input (No in S48), the processing returns to step S24 illustrated in FIG. 12 and controller 22 causes display 27 to display a guidance map. After this, the above processing is repeated until user 2 arrives at the destination.

[Operation of Transmitting Device]

Figure 22:
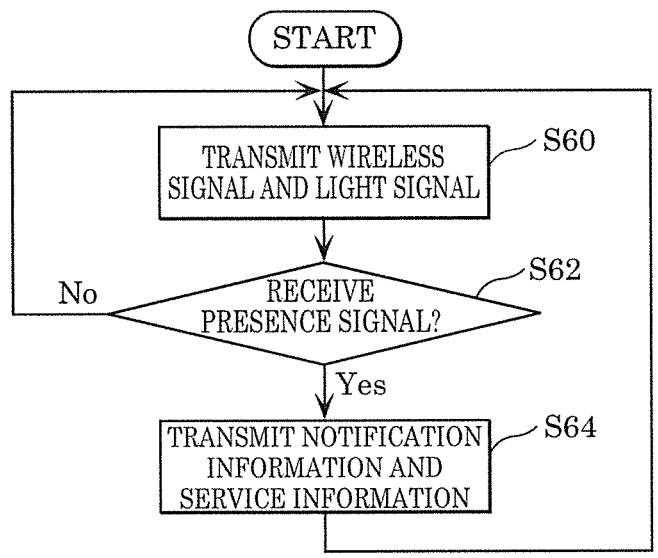
FIG. 22 is a flowchart illustrating operation of the transmitting device according to the embodiment.

Next, operation of transmitting device 10 is described with reference to FIG. 22. FIG. 22 is a flowchart illustrating operation of transmitting device 10 according to the present embodiment.

First, transmitting device 10 transmits a wireless signal and a light signal (S60). Specifically, light source 11 emits illumination light (i.e., light signal) having visible light ID 14 superimposed thereon. For example, controller 12 causes light source 11 to constantly emit illumination light, thereby repeatedly transmitting visible light ID 14. Communications circuit 16 repeatedly transmits a radio beacon as a wireless signal.

If communications circuit 16 receives a presence signal from mobile device 20 (Yes in S62), controller 12 transmits notification information and service information (S64). Specifically, controller 12 causes communications circuit 16 to transmit the notification information by wireless communications not including visible light communication. Controller 12 further controls light source 11 so that service information 15 is superimposed on visible light, and transmits service information 15. It should be noted that if storage 13 is not storing service information 15, controller 12 may cause communications circuit 16 to transmit the notification information, and light source 11 continues to transmit visible light ID 14.

After this, the processing returns to step S60, and transmitting device 10 continues to transmit the wireless signal and the light signal.

[Operation of Server Device]

Figure 23:
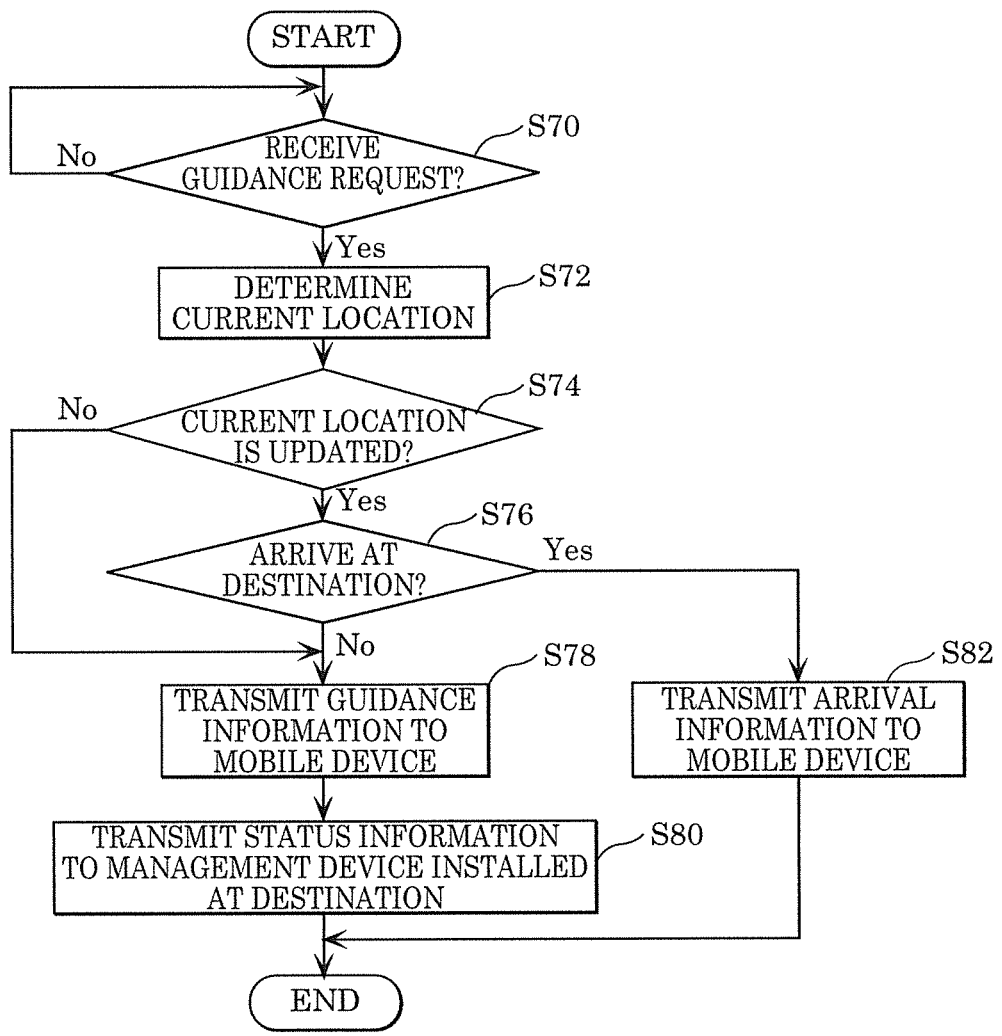
FIG. 23 is a flowchart illustrating operation of a server device according to the embodiment.

Next, operation of server device 30 is described with reference to FIG. 23. FIG. 23 is a flowchart illustrating operation of server device 30 according to the present embodiment.

First, server device 30 waits for communications circuit 34 to receive a guidance request from mobile device 20 (No in S70). If communications circuit 34 receives a guidance request (Yes in S70), controller 35 determines a current location of mobile device 20, based on visible light ID 14 included in the guidance request (S72). Specifically, controller 35 determines a location corresponding to visible light ID 14 as a current location, by reference to correspondence table 32 stored in storage 31.

Next, controller 35 determines whether the current location is updated by the determined current location, by reference to history information (S74). If the current location is updated by the determined current location (Yes in S74), and if the updated current location is not a destination indicated by the destination information that is included in the guidance request (No in S76), controller 35 transmits guidance information to mobile device 20 (S78). Specifically, controller 35 generates guidance information, based on the determined current location and the destination information that is included in the guidance request. Then, communications circuit 34 transmits the guidance information generated by controller 35 to mobile device 20.

It should be noted that if storage 31 is storing no history information, controller 35 transmits the guidance information to mobile device 20 (S78), without determining whether the current location is updated and determining the next destination (S76).

If the current location is not updated (No in S74), controller 35 transmits the guidance information to mobile device 20 (S78). In this case, there is no update on current location. Guidance information of the same content has already been transmitted. For this reason, the guidance information may be information indicating that the guidance information is the same as the previous guidance information, without including a map, etc.

Further, controller 35 transmits status information to management device 40 installed at the destination (S80). Specifically, controller 35 associates the current location and a current time with identification information unique to mobile device 20, and transmits them as status information.

If the updated current location is the destination (Yes in S76), controller 35 transmits arrival information to mobile device 20 (S82). The arrival information indicates that user 2 (mobile device 20) has arrived at the destination. For example, if received arrival information, instead of guidance information, after the transmission of a guidance request, mobile device 20 makes user 2 confirm his/her arrival at the destination, and ends the guidance program.

[Operation of Management Device]

Figure 24:
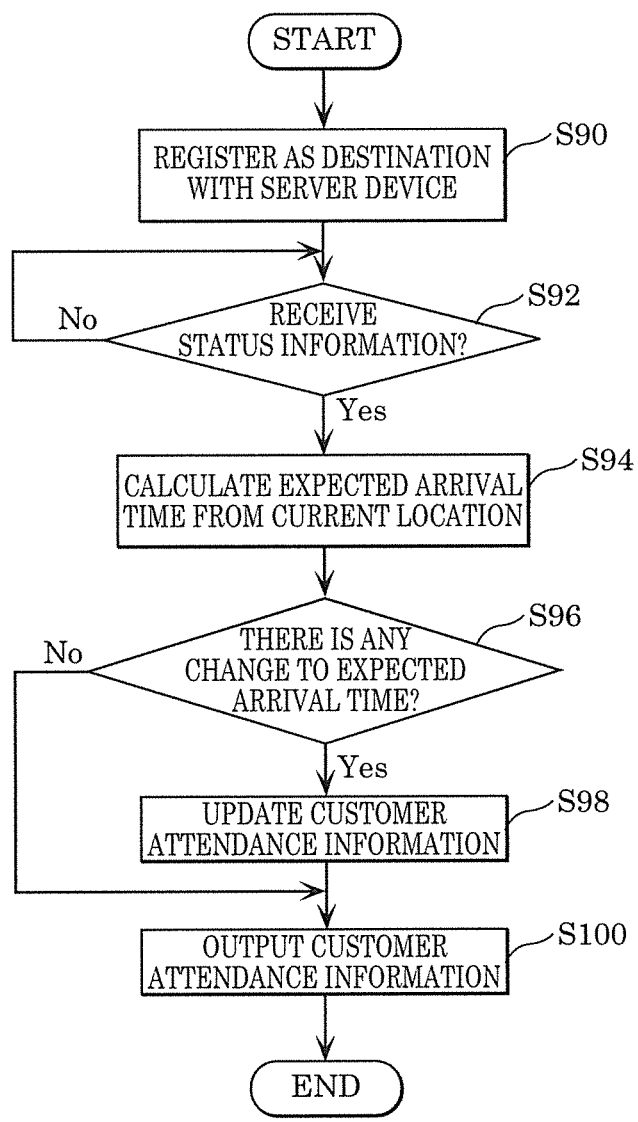
FIG. 24 is a flowchart illustrating operation of a management device according to the embodiment.

Next, operation of management device 40 is described with reference to FIG. 24. FIG. 24 is a flowchart illustrating operation of management device 40 according to the present embodiment.

First, management device 40 registers management device 40 as a destination with server device 30 (S90). Specifically, controller 42 transmits a registration request to server device 30 via communications circuit 41. The registration request includes, for example, the name of a facility at which management device 40 is installed. If obtained the registration request, controller 35 included in server device 30 associates the name of facility included in the registration request as a destination and identification information unique to management device 40 that has transmitted the registration request. Controller 35 stores the destination and the identification information in association as destination registration information 33 into storage 31.

Next, management device 40 waits for communications circuit 41 to receive status information from server device 30 (No in S92). If communications circuit 41 receives status information from server device 30 (Yes in S92), controller 42 calculates an expected arrival time of user 2 from the current location of user 2 (mobile device 20) (S94). For example, in the case where management device 40 is installed at "AAA STADIUM" illustrated in FIGS. 10 and 11, controller 42 estimates an expected arrival time and an expected arrival gate.

If there is any change to expected arrival time (Yes in S96), controller 42 updates customer attendance information 44 (S98). Specifically, controller 42 replaces the expected arrival time and the expected arrival gate included in customer attendance information 44 with newly estimated information.

Next, output 45 reads and outputs customer attendance information 44 from storage 43 (S100). Since there is no need to update customer attendance information 44 if there is no change to expected arrival time (No in S96), output 45 reads and outputs customer attendance information 44 from storage 43 (S100).

Specifically, controller 42 generates an expected customer attendance image which indicates a status of attendance of customers at a time designated by an operator of management device 40. For example, if the designated time is one hour before the start time of an event (i.e., game), controller 42 generates expected customer attendance image 46 as illustrated in FIG. 10, and causes output 45 to display it. If, for example, the designated time is the start time of an event (i.e., game), controller 42 generates expected customer attendance image 47 as illustrated in FIG. 11, and causes output 45 to display it.

[Effects]

As described above, mobile device 20 according to the present embodiment includes communications circuit 24 which performs wireless communication not including visible light communication; receiver 23 which receives input of a destination from user 2; output 25 which outputs guidance information for guiding user 2 from a current location to the destination; and controller 22 which causes output 25 to output notification information for notifying presence of transmitting device 10 which emits light for visible light communications, if communications circuit 24 receives a wireless signal from transmitting device 10 by the wireless communication.

In this manner, output 25 outputs the notification information if communications circuit 24 receives the wireless signal. Thus, mobile device 20 can notify user 2 of the presence of transmitting device 10 capable of visible light communications. In other words, mobile device 20 can provide user 2 with opportunities (chances) to obtain a current location by performing visible light communications with transmitting device 10. This facilitates user 2 performing visible light communications with mobile device 20 and obtaining a new current location, thereby encouraging user 2 to better understand the route to the destination. Thus, mobile device 20 can properly guide user 2 to the destination.

Moreover, for example, mobile device 20 further includes light receiver 21 which receives the light for visible light communications emitted by transmitting device 10, the light including predetermined information, wherein controller 22 further obtains a location of transmitting device 10, based on the predetermined information included in the light received by light receiver 21, and updates the guidance information with the location as a new current location.

In this manner, mobile device 20 includes capturer 21. Thus, mobile device 20 can obtain a new current location by performing visible light communications with transmitting device 10. This allows mobile device 20 to utilize, for example, transmitting device 10, that is located in the middle of guidance of user 2 to the destination, to obtain the current location of user 2, and properly guide user 2 such as updating the guidance information according to need.

Moreover, for example, communications circuit 24 includes: first wireless communications circuit 24a which receives the wireless signal by near-field communication; and second wireless communications circuit 24b which transmits a request for the guidance information, and obtains the guidance information as a response to the request.

In this manner, first wireless communications circuit 24a utilizes the near-field communications to receive a wireless signal. Thus, first wireless communications circuit 24a can receive a wireless signal from transmitting device 10 nearby user 2 (mobile device 20). This allows mobile device 20 to notify user 2 of the near presence of transmitting device 10 capable of visible light communications, thereby encouraging user 2 to discover transmitting device 10. In other words, mobile device 20 can provide user 2 with strong opportunities to perform visible light communications, and properly guide user 2 if user 2 performs the visible light communications.

Moreover, for example, if first wireless communications circuit 24a receives the wireless signal, controller 22 further generates a presence signal indicating a presence of mobile device 20, and first wireless communications circuit 24a further transmits the presence signal to transmitting device 10 and receives the notification information as a response to the presence signal.

In this manner, if received the wireless signal, first wireless communications circuit 24a transmits the presence signal for receiving the notification information. Thus, the presence signal transmitted by first wireless communications circuit 24a is likely to be received by transmitting device 10. This obviates the need for first wireless communications circuit 24a to generate and transmit a presence signal in a situation where, for example, a presence signal is less likely to be received by transmitting device 10 such as a case of absence of nearby transmitting device 10. Thus, the power consumption of mobile device 20 can be reduced.

Moreover, for example, the notification information is an image for notifying the presence of transmitting device 10, and output 25 includes display 27 which displays the image.

In this manner, display 27 displays the image, thereby notifying user 2 of the presence of transmitting device 10 in a visually clear manner. This allows mobile device 20 to provide user 2 with strong opportunities to perform visible light communications, and properly guide user 2 if user 2 performs the visible light communications.

Moreover, for example, the notification information is audio guidance for notifying the presence of transmitting device 10, and output 25 includes audio output 26 which outputs the audio guidance.

In this manner, audio output 26 outputs the audio guidance, thereby notifying user 2 of the presence of transmitting device 10 in an audibly clear manner. This allows mobile device 20 to provide user 2 with strong opportunities to perform visible light communications, and properly guide user 2 if user 2 performs the visible light communications, even if the mobile device is otherwise currently in garment pockets or bags.

Transmitting device 10 according to the present embodiment transmits predetermined information by visible light communications, transmitting device 10 including: light source 11 which emits light for visible light communications, the light including the predetermined information; communications circuit 16 which performs wireless communication not including visible light communication and receives a presence signal indicating presence of a predetermined device; and controller 12 which causes communications circuit 16 to transmit notification information for notifying a presence of transmitting device 10, if communications circuit 16 receives the presence signal.

In this manner, communications circuit 16 transmits the notification information if received the presence signal, and thus transmitting device 10 can notify user 2 of the presence of transmitting device 10 capable of visible light communications. In other words, transmitting device 10 can provide user 2 with opportunities (chances) to obtain a current location by performing visible light communications with transmitting device 10. This allows transmitting device 10 to make user 2 perform visible light communications and obtain a new current location, thereby encouraging user 2 to better understand the route to the destination. Thus, transmitting device 10 can properly guide user 2.

Moreover, for example, communications circuit 16 transmits a wireless signal, and receives the presence signal transmitted from mobile device 20 which has received the wireless signal.

In this manner, communications circuit 16 transmits the wireless signal. Thus, transmitting device 10 can notify the presence of transmitting device 10 to mobile device 20 that is passing nearby transmitting device 10. For example, transmitting device 10 continuously, repeatedly transmits a wireless signal, thereby increasing the likelihood that the wireless signal is received by mobile device 20. For this reason, transmitting device 10 can effectively provide user 2 with opportunities to perform visible light communications.

It should be noted that since the wireless signal may be any signal that triggers the transmission of a presence signal by mobile device 20, information content of the signal can be reduced. For this reason, the power consumption of transmitting device 10 for transmission of wireless signals can be reduced.

Moreover, for example, communications circuit 16 further transmits service information 15 according to a location where transmitting device 10 is installed.

In this manner, communications circuit 16 transmits the customer service information, thereby allowing transmitting device 10 to transmit useful information to user 2 of mobile device 20, for example. It should be noted that since user 2 can obtain useful information if he/she uses the guidance program, transmitting device 10 facilitates a user who is not using the guidance program to utilize it.

Moreover, for example, the predetermined information includes service information 15 and identification information which is unique to transmitting device 10.

In this manner, transmitting device 10 transmits the customer service information by visible light communications, thereby transmitting useful information only to users of the guidance program, for example. This can thus further enhance the effects of facilitating a user who is not using the guidance program to utilize it.

Moreover, guidance system 1 according to the present embodiment includes mobile device 20; and transmitting device 10.

This allows guidance system 1 to provide user 2 with opportunities to obtain a current location by performing visible light communications between transmitting device 10 and mobile device 20. Thus, guidance system 1 can properly guide user 2 to the destination.

Moreover, for example, guidance system 1 further includes server device 30 including: storage 31 storing correspondence table 32 in which predetermined information and a location of transmitting device 10 are associated; communications circuit 34 which receives a request for the guidance information, the request including the predetermined information and destination information which indicates the destination; and controller 35 which determines, by reference to correspondence table 32, a current location of transmitting device 10 based on the predetermined information included in the request for the guidance information, and generates, as the guidance information, information which indicates a route from the current location of transmitting device 10 to the destination indicated by the destination information, wherein communications circuit 34 included in server device 30 further transmits the guidance information to mobile device 20.

In this manner, server device 30 generates the guidance information, thereby achieving a reduction in processing load on mobile device 20. For example, mobile device 20 only needs to communicate with server device 30. Moreover, since server device 30 typically has higher throughput than mobile device 20, the guidance information can quickly be provided to user 2 by causing server device 30 to perform the processing that causes high load, such as the reference to correspondence table 32 and the generation of the guidance information. Moreover, since the information from a plurality of users 2 are aggregated, the aggregated information can be utilized for a variety of purposes.

Moreover, for example, communications circuit 34 included in server device 30 further transmits information that is based on the request for the guidance information to management device 40 which is by way of example of an electronic device installed at the destination indicated by the destination information.

This allows management device 40 to know an approximate status of attendance of customers because communications circuit 34 transmits, to management device 40 installed at the destination, the information that is based on the guidance request. Stated differently, this allows management device 40 to estimate, for each user 2 (for each mobile device 20), when and where user 2 would arrive. Thus, management device 40 can appropriately manage (providing security, etc. to) the destination (i.e., facility).

Variation

In the following, a variation of the transmitting device according to the embodiment set forth above is described with reference to the accompanying drawings.

For example, while the above embodiment has been described with reference to mark 19 or 19a actually provided on a guidance display surface of transmitting device 10, the present disclosure is not limited thereto. For example, transmitting device 10 may project a mark on a predetermined display surface.

Figure 25:
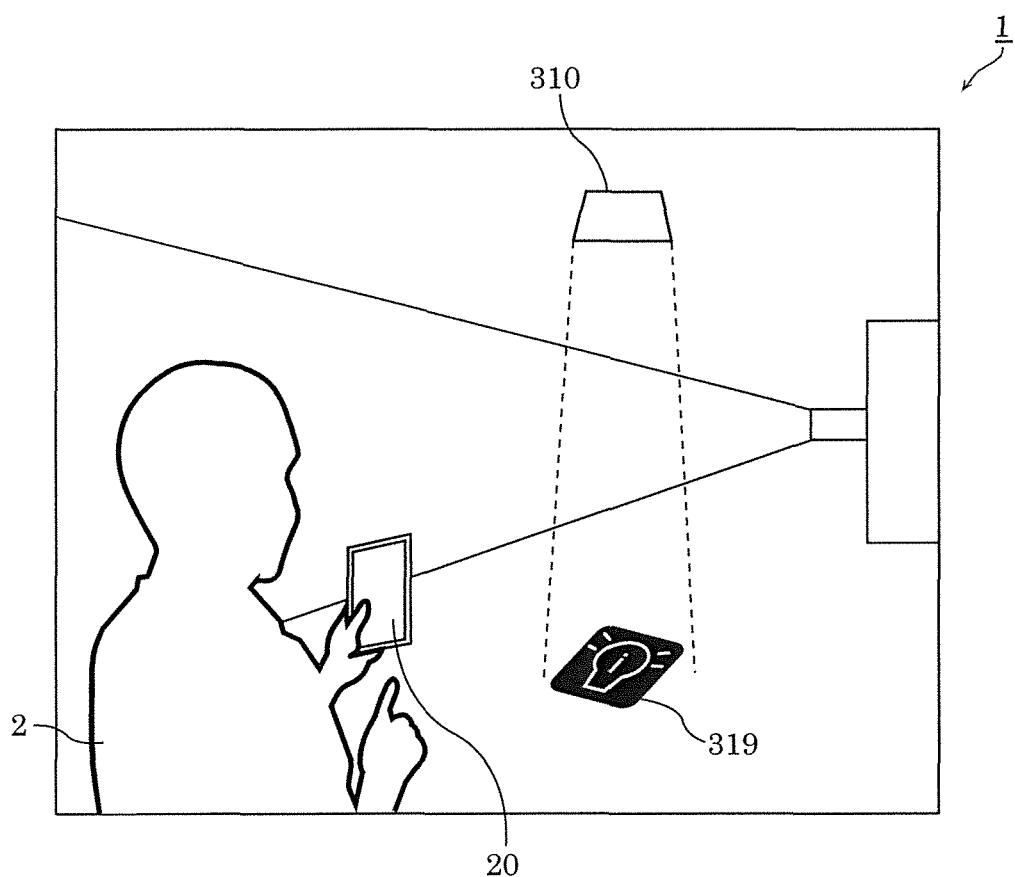
FIG. 25 is a schematic view illustrating an example of display of a mark according to a variation of the embodiment.

FIG. 25 is a schematic view illustrating an example of display of mark 319 according to the variation of the embodiment.

As illustrated in FIG. 25, transmitting device 310 according to the variation of the embodiment projects mark 319 on a floor. Specifically, transmitting device 310 projects mark 319 on a floor if received a presence signal from mobile device 20.

This allows transmitting device 310 to display mark 319 on the floor only when user 2 (mobile device 20) is passing nearby transmitting device 310. Using mobile device 20, user 2 captures a video of mark 319 or directly captures a video of transmitting device 310 projecting mark 319. This allows mobile device 20 to perform visible light communications with transmitting device 310, thereby obtaining a current location via server device 30.

It should be noted that the surface on which mark 319 is projected is not limited to a floor and may be the ceiling or a surface of a wall.

Alternatively, the mark may be presented in Augmented Reality. In other words, the mark may be displayed on display 27 included in mobile device 20 when capturer 21 included in mobile device 20 captures a video of transmitting device 310. Stated differently, although user 2 cannot find the mark when looking at transmitting device 310 and its surroundings, the mark is displayed on display 27 when user 2 sees transmitting device 310 through display 27 included in mobile device 20.

For example, if received visible light ID 14 from transmitting device 310 by visible light communications, controller 22 included in mobile device 20 causes display 27 to display the mark superimposed on the captured image. This presents the mark in Augmented Reality on display 27.

Since the mark is presented in Augmented Reality, the mark is not recognizable by a general user who is not using visible light communications. For this reason, convenience for a user utilizing visible light communications is enhanced, without making a general user feel uncomfortable.

Other Embodiments

While the mobile device, the transmitting device and the guidance system according to the present disclosure have been described with reference to the above embodiment and the variation thereof, the present disclosure is not limited to the above embodiment.

For example, the above embodiment has been described with reference to transmitting device 10 continuously, repeatedly transmitting a wireless signal, the present disclosure is not limited thereto. For example, the presence signal may be a radio beacon, and mobile device 20 may continuously, repeatedly transmit the presence signal. Alternatively, mobile device 20 may continuously, repeatedly transmit the presence signal for a period of time if an indication to do so is given from user 2. If received the presence signal, transmitting device 10 transmits notification information to mobile device 20.

This can cause mobile device 20 to transmit a presence signal by making user 2 operate mobile device 20 when he/she desires to confirm a current location, for example. If transmitting device 10 which performs visible light communications is present nearby mobile device 20, mobile device 20 receives the notification information and the notification information is displayed on display 27. This allows user 2 to identify the installation location of transmitting device 10, based on the notification information and capture a video of transmitting device 10, thereby updating the current location and obtain new guidance information, as with the embodiment.

Moreover, for example, the above embodiment has been described with reference to transmitting device 10 transmitting the notification information as a response to a presence signal, the present disclosure is not limited thereto. Transmitting device 10 may transmit the notification information in a wireless signal. Stated differently, transmitting device 10 may continuously, repeatedly transmit the notification information, without receiving a presence signal from mobile device 20. According to this, mobile device 20 receives and displays the notification information on display 27 when user 2 is passing nearby transmitting device 10.

Moreover, for example, while capturer 21 has been described by way of example of a light receiver included in mobile device 20 in the above embodiment, the present disclosure is not limited thereto. Stated differently, the light receiver may be, for example, a photodiode, rather than the image sensor.

Moreover, for example, the guidance request may include a request for a translation of guidance display. For example, description on guidance display, such as a sign, installed in a certain country is provided in the mother language of the county, possibly with some foreign language such as English. Due to this, foreigners who understand neither the mother language of the country nor English may not know the current location from the guidance display since they do not understand the description on the guidance display.

To address this, mobile device 20 includes a request for a translation of the guidance display in a guidance request, and receives the translation from server device 30. The request for a translation includes language information indicating a language which is designated by user 2 and into which the guidance display is to be translated.

If the guidance request which server device 30 receives includes a request for a translation, server device 30 transmits a translation of guidance display 18 to mobile device 20. For example, in correspondence table 32, the description in guidance display 18 is associated with visible light ID 14. Controller 35 selects guidance display 18 that is corresponding to visible light ID 14 included in the guidance request, and translates the description in guidance display 18 into a predetermined language. It should be noted that the predetermined language is the language indicated by the language information. Controller 35 transmits the translation to mobile device 20 via communications circuit 34.

Guidance display 18 may be translated using a server device for translation different from server device 30. Alternatively, translations of guidance display 18 in different languages may be previously stored in correspondence table 32. Also, controller 35 may translate not only guidance display 18 but also the guidance information and transmit the translations to mobile device 20.

The components according to the above embodiment may be implemented in a form of dedicated hardware. Alternatively, the components may be implemented through execution of a software program suited for each component. Each component may be implemented by a program execution unit, such as central processing unit (CPU) or processor, loading and executing the software program stored in a storage medium such as a hard disk or a semiconductor memory.

It should be noted that the present disclosure can be implemented not only in the mobile device, the transmitting device, or the guidance system but also in a program which includes as steps the processes performed by the components included in the mobile device, the transmitting device, or the guidance system, and in a computer-readable storage medium storing the program, such as a digital versatile disc (DVD).

In other words, the general or specific aspects of the present disclosure described above may be implemented in a system, apparatus, integrated circuit, computer program, or computer-readable storage medium, or may be implemented in any combination of the system, apparatus, integrated circuit, computer program, and storage medium.

In other instances, various modifications to the exemplary embodiment according to the present disclosure described above that may be conceived by a person skilled in the art and embodiments implemented in any combination of the components and functions shown in the exemplary embodiment are also included within the scope of the present disclosure, without departing from the spirit of the present disclosure.

What is claimed is:

1. A mobile device comprising:
a communications circuit which performs wireless communication not including visible light communication;
a receiver which receives input of a destination from a user;
an output which outputs guidance information for guiding the user from a current location to the destination; and
a controller which causes the output to output notification information for notifying a presence of a transmitting device which emits light for visible light communications and a location of the transmitting device, to the user by text or audio guidance, if the communications circuit receives a wireless signal from the transmitting device by the wireless communication.

2. The mobile device according to claim 1, further comprising
a light receiver which receives the light for visible light communications emitted by the transmitting device, the light including predetermined information, wherein
the controller further obtains a location of the transmitting device, based on the predetermined information included in the light received by the light receiver, and updates the guidance information with the location as a new current location.

3. The mobile device according to claim 2, wherein
the communications circuit includes:
a first wireless communications circuit which receives the wireless signal by near-field communication; and
a second wireless communications circuit which transmits a request for the guidance information, and obtains the guidance information as a response to the request.

4. The mobile device according to claim 3, wherein
if the first wireless communications circuit receives the wireless signal, the controller further generates a presence signal indicating a presence of the mobile device, and
the first wireless communications circuit further transmits the presence signal to the transmitting device and receives the notification information as a response to the presence signal.

5. The mobile device according to claim 1, wherein
the notification information is an image for notifying the presence of the transmitting device, and
the output includes a display which displays the image.

6. The mobile device according to claim 1, wherein
the notification information is audio guidance for notifying the presence of the transmitting device, and
the output includes an audio output which outputs the audio guidance.

7. A guidance system comprising:
the mobile device according to claim 1; and
the transmitting device.

8. The guidance system according to claim 7, further comprising
a server device including:
a storage storing a correspondence table in which predetermined information and a location of the transmitting device are associated;
a communications circuit which receives a request for the guidance information, the request including the predetermined information and destination information which indicates the destination; and a controller which determines, by reference to the correspondence table, a current location of the transmitting device based on the predetermined information included in the request for the guidance information, and generates, as the guidance information, information which indicates a route from the current location of the transmitting device to the destination indicated by the destination information, wherein the communications circuit included in the server device further transmits the guidance information to the mobile device.

9. The guidance system according to claim 8, wherein the communications circuit included in the server device further transmits information that is based on the request for the guidance information to an electronic device installed at the destination indicated by the destination information.

10. A transmitting device which transmits predetermined information by visible light communications, the transmitting device comprising:
    a light source which emits light for visible light communications, the light including the predetermined information;
    a communications circuit which performs wireless communication not including visible light communication and receives a presence signal indicating a presence of a predetermined device; and
    a controller which causes the communications circuit to transmit notification information for notifying a presence of the transmitting device, if the communications circuit receives the presence signal,
    wherein the transmitting device has, or projects onto a predetermined surface, a mark indicating that the transmitting device is a transmission source of the light for visible light communications.

11. The transmitting device according to claim 10, wherein
    the communications circuit transmits a wireless signal, and receives the presence signal transmitted from the predetermined device which has received the wireless signal.

12. The transmitting device according to claim 10, wherein
    the communications circuit further transmits customer service information according to a location where the transmitting device is installed.

13. The transmitting device according to claim 12, wherein
    the predetermined information includes the customer service information and identification information which is unique to the transmitting device.

\* \* \* \* \*